(12) United States Patent
Kim et al.

(10) Patent No.: US 8,964,591 B2
(45) Date of Patent: Feb. 24, 2015

(54) METHOD AND DEVICE FOR TRANSMITTING/RECEIVING CHANNEL STATE INFORMATION IN A WIRELESS COMMUNICATION SYSTEM

(75) Inventors: Hyungtae Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 162 days.

(21) Appl. No.: 13/806,996

(22) PCT Filed: Jun. 23, 2011

(86) PCT No.: PCT/KR2011/004595
§ 371 (c)(1),
(2), (4) Date: Dec. 26, 2012

(87) PCT Pub. No.: WO2012/002673
PCT Pub. Date: Jan. 5, 2012

(65) Prior Publication Data
US 2013/0163461 A1  Jun. 27, 2013

Related U.S. Application Data

(60) Provisional application No. 61/359,353, filed on Jun. 29, 2010, provisional application No. 61/405,218, filed on Oct. 21, 2010.

(51) Int. Cl.
| | |
|---|---|
| H04L 12/28 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl.
USPC ............ 370/252; 370/208; 370/241; 370/329

(58) Field of Classification Search
USPC ................ 370/241–252, 329–335, 338–342; 375/299–340; 455/450–509
See application file for complete search history.

(56) References Cited

U.S. PATENT DOCUMENTS

| | | | |
|---|---|---|---|
| 6,549,544 B1 | 4/2003 | Kroeger et al. | |
| 8,423,858 B2 * | 4/2013 | Ahn et al. | 714/748 |
| 8,472,471 B2 * | 6/2013 | Yang et al. | 370/464 |
| 8,565,064 B2 * | 10/2013 | Tang et al. | 370/208 |
| 8,699,602 B2 * | 4/2014 | Chen et al. | 375/267 |
| 8,744,361 B2 * | 6/2014 | Shin et al. | 455/63.1 |
| 2008/0080635 A1 | 4/2008 | Hugl et al. | |
| 2008/0175330 A1 | 7/2008 | Jeon et al. | |
| 2010/0232311 A1 * | 9/2010 | Zhang et al. | 370/252 |
| 2011/0317581 A1 * | 12/2011 | Hoshino et al. | 370/252 |
| 2012/0113948 A1 * | 5/2012 | Kwon et al. | 370/329 |
| 2012/0294153 A1 * | 11/2012 | Lee et al. | 370/241 |
| 2012/0327874 A1 * | 12/2012 | Eriksson et al. | 370/329 |

* cited by examiner

*Primary Examiner* — Man Phan
(74) *Attorney, Agent, or Firm* — Lee, Hong, Degerman, Kang & Waimey

(57) ABSTRACT

The present invention relates to a wireless communication system, and more particularly, to a method and device for transmitting/receiving channel state information (CSI). A method for a terminal for transmitting CSI according to one embodiment of the present invention includes: a first step of receiving a reference signal for channel measurement from a base station; a second step of generating sub-band (SB) CSI for each of a plurality of SBs using the received reference signal in the terminal and sequentially transmitting the generated SB CSI to a base station; and a third step of sequentially transmitting each SB CSI to a base station according to an order different from that of the sequential transmission.

12 Claims, 18 Drawing Sheets

FIG. 6
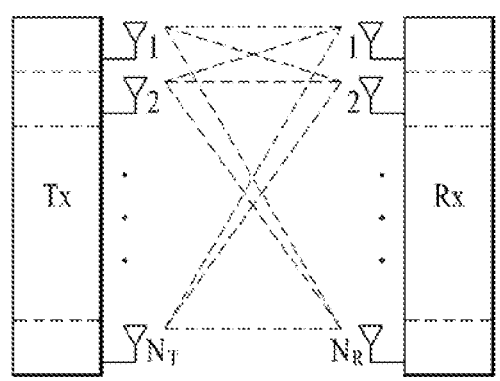
(a)
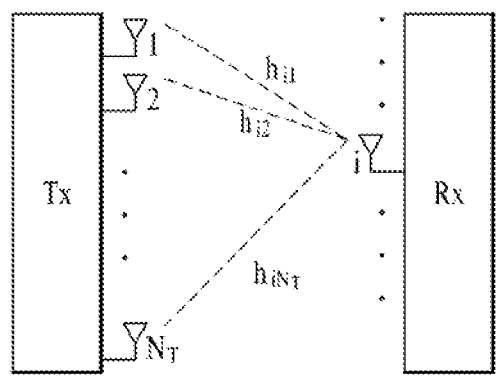
(b)

FIG. 7
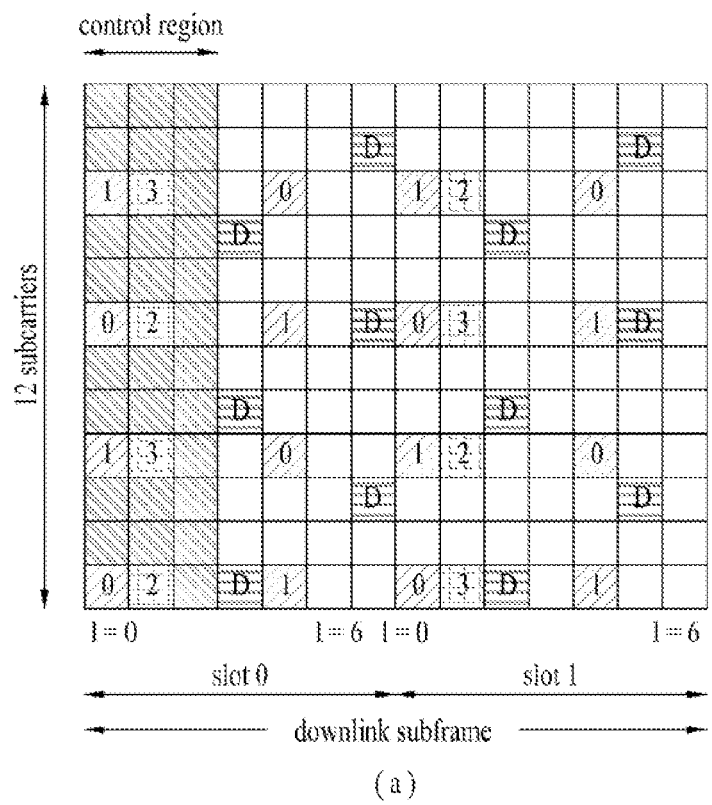
(a)
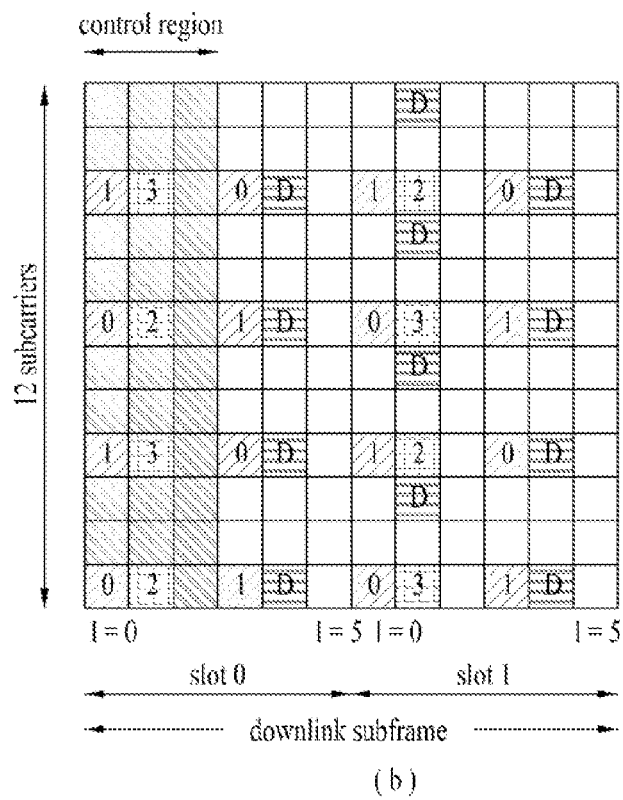
(b)

FIG. 9
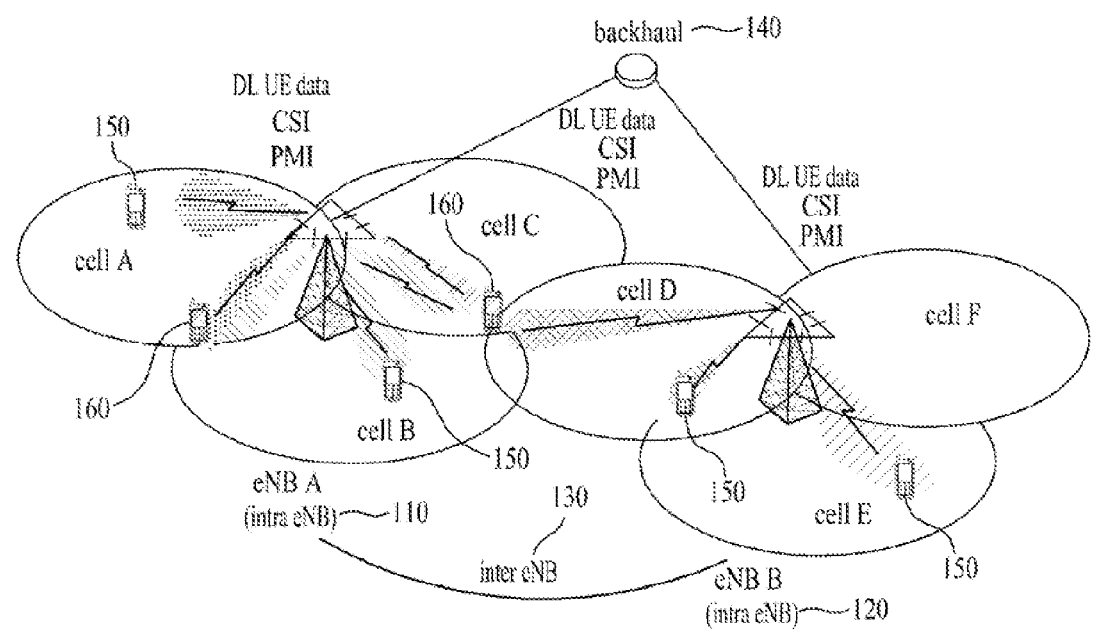
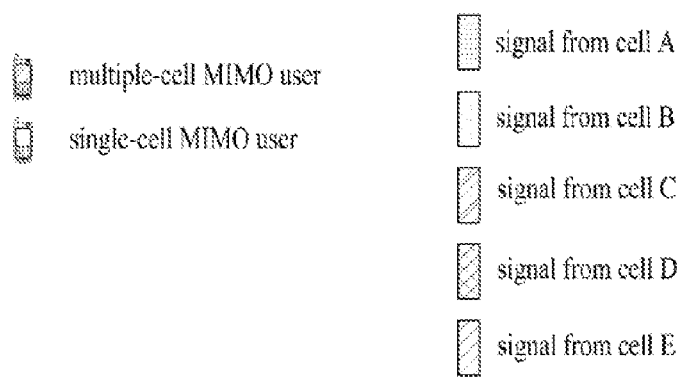

FIG. 11

METHOD AND DEVICE FOR TRANSMITTING/RECEIVING CHANNEL STATE INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2011/004595, filed on Jun. 23, 2011, which claims the benefit of U.S. Provisional Application Ser. No. 61/359,353, filed on Jun. 29, 2010, and U.S. Provisional Application Ser. No. 61/405,218, filed on Oct. 21, 2010, the contents of which are all hereby incorporated by reference herein in their entirety.

TECHNICAL FIELD

The present invention relates to a wireless communication system, and more particularly, to a method and device for transmitting/receiving channel state information (CSI).

BACKGROUND ART

Multiple-input multiple-output (MIMO) technology is a technology for enhancing transmission and reception efficiency of data using multiple transmission antennas and multiple reception antennas instead of using one transmission antenna and one reception antenna. When a single antenna is used, the receiving side receives data through a single antenna path, but if multiple antennas are used, the receiving end receives data through various paths. Hence, the transmission rate of data and the amount of data transmitted may be enhanced, and coverage may be increased.

In a multiple antenna wireless communication system, a rank indicator (RI), a precoding matrix index (PMI), channel quality information (CQI), etc. are defined as information, which is fed back to the receiving end (e.g., a terminal) and the transmitting end (e.g., a base station). Such feedback information may be called channel state information (CSI). The PMI and RI, which is preferred by the terminal, may be fed back to the base station. Here, if used in a base station in a given channel state, the PMI and RI, which is preferred by the terminal, corresponds to the downlink transmission rank value and precoder information which may have the highest transmission rate. Further, the CQI is calculated on the basis of the RMI/RI reported by the terminal, and corresponds to the modulation and coding scheme (MCS) level applied to downlink transmission. Here, in the case in which the precoder information and rank value according to the PMI/RI reported by the terminal is used, the CQI may indicate an MCS level which provides an allowable packet error rate.

Channel measurement should be performed for the report of the CSI, and channel measurement may be performed using a reference signal (RS). In a conventional multi-antenna wireless communication system, channel measurement may be performed using a reference signal (e.g., a common RS (CRS)) transmitted for each subframe.

DISCLOSURE

Technical Problem

Introduction of a new system having a more extended antenna configuration than the conventional multi antenna wireless communication system is under discussion. For example, the conventional system has supported a maximum of four transmission antennas, but a new system having an extended antenna configuration may provide an enhanced system capacity by supporting MIMO transmission through 8 transmission antennas. In the wireless communication system, which supports such an extended multi antenna configuration, introduction of a new reference signal (e.g., CSI-RS) for channel measurement is under consideration. The new reference signal for channel measurement is not transmission for every subframe, but may be intermittently transmitted to reduce reference signal overhead.

CSI-RS, which is intermittently transmitted according to a preset period, may be used for channel measurement in a wireless communication system which supports the extended multi antenna configuration and thus, in the case in which the conventional channel measurement and reporting method, which use the CRS transmitted in every subframe, is applied, the actual channel state may not be accurately reflected.

An object of the present invention devised to solve the problem lies in providing a method and device for transmitting and receiving channel state information so that an error in channel state is reduced and resources are efficiently utilized when performing channel measurement and report using CSI-RS.

The objects of the present invention are not limited to the objects mentioned above, and other objects, which have not been mentioned above, may be clearly understood from the disclosure below by those skilled in the art.

Technical Solution

An object of the present invention can be achieved by providing a method for transmitting channel state information (CSI) in a terminal, including a first step of receiving a reference signal for channel measurement from a base station, a second step of generating sub-band (SB) CSI for each of a plurality of SBs using the received reference signal in the terminal and sequentially transmitting the generated SB CSI to the base station, a third step of sequentially transmitting each SB CSI to a base station according to an order different from that of the sequential transmission.

In another aspect of the present invention, provided herein is a method for receiving channel state information (CSI) in a base station, including a first step of transmitting a reference signal for channel measurement to a terminal, a second step of sequentially receiving, from the terminal, sub-band CSI generated in the terminal for each of a plurality of sub-bands (SBs), and a third step of sequentially receiving each SB CSI from the terminal according to an order different from that of the sequential transmission.

In another aspect of the present invention, provided herein is a terminal for transmitting channel state information (CSI), including a receiving module for receiving a downlink signal from a base station, a transmitting module for transmitting an uplink signal to the base station, and a processor for controlling the terminal, the processor including the receiving module and the transmitting module, wherein the processor receives a reference signal for channel measurement from the base station through the receiving module, generates sub-band (SB) CSI for each of a plurality sub-bands (SBs) using the received reference signal in the terminal, sequentially transmits the generated SB CSI to the base station through the transmitting module, and sequentially transmits each SB CSI to the base station through the transmitting module according to an order different from that of the sequential transmission.

In another aspect of the present invention, provided herein is a base station for receiving channel state information (CSI), including a receiving module for receiving an uplink signal from a terminal, a transmitting module for transmitting a downlink signal to the terminal, and a processor for controlling the base station, the processor including the receiving module and the transmitting module, wherein the processor transmits a reference signal for channel measurement to the terminal through the transmitting module, sequentially receives the SB CSI, which is generated in the terminal for each of a plurality of sub-bands (SBs) using the transmitted reference signal, from the terminal through the receiving module, and sequentially receives each SB CSI from the terminal through the receiving module according to an order different from that of the sequential transmission.

The following may be commonly applied to the embodiments of the present invention.

The different order may be an order which has been changed according to a cyclic shift scheme or an order which has been changed reversely.

The reference signal for channel measurement may be transmitted from the base station to the terminal after sequentially receiving, from the terminal, sub-band CSI generated in the terminal for each of a plurality of sub-bands (SBs) and before sequentially receiving each SB CSI from the terminal according to an order different from that of the sequential transmission.

The transmitted SB CSI may be SB CSI which is generated using the most recently received reference signal.

The step of sequentially transmitting each SB CSI to a base station according to an order different from that of the sequential transmission may be repeated.

For one or more terminals other than the terminal, a step of transmitting a reference signal, sequentially transmitting the SB CSI, which has been generated in the terminal for each of a plurality of sub-bands (SBs) using the transmitted reference signal, from the terminal to the base station, and sequentially transmitting the SB CSI from the terminal to the base station according to an order different from the sequential transmission, may be performed. Here, the CSI transmission and reception method may further include sequentially receiving CSI from each of a plurality of terminals including the terminal and the one or more terminals, and sequentially receiving CSI from each of the plurality of terminals in an order different from the order in which CSI has been received from the plurality of terminals.

The above stated general explanation about the present invention and the following detailed description are exemplary, and are for additional explanation on the inventions disclosed in the claims.

Advantageous Effects

According to the present invention, a method and apparatus for transmitting and receiving channel state information, in which an error in the channel state is reduced and resources are efficiently utilized, may be provided when performing channel measurement and report using CSI-RS.

The effects of the present invention are not limited to the effects mentioned above, and other effects will be clearly understood by those skilled in the art from the disclosure below.

DESCRIPTION OF DRAWINGS

The accompanying drawings, which are included to provide a further understanding of the invention, illustrate embodiments of the invention and together with the description serve to explain the principle of the invention.

FIG. 6 illustrates a structure of a wireless communication system having multiple antennas.

FIG. 7 illustrates a reference signal pattern defined in a conventional LTE system.

FIG. 9 conceptually illustrates a CoMP operation of an intra eNB and an inter eNB.

FIGS. 11 and 12 illustrate a CSI feedback scheme according to an exemplary embodiment of the present invention.

BEST MODE

Figure 1:
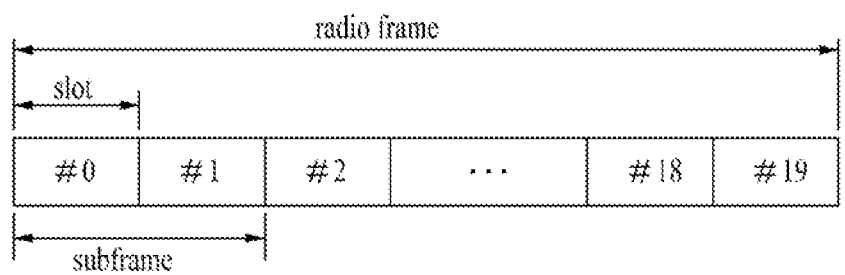
FIG. 1 illustrates a structure of a type 1 wireless frame.

First of all, the following embodiments correspond to combinations of elements and features of the present invention in prescribed forms. The respective elements or features may be considered selective unless explicitly mentioned otherwise. Each of the elements or features can be implemented in a form failing to be combined with other elements or features. Moreover, an embodiment of the present invention may be implemented by combining elements and/or features. A sequence of operations explained for each embodiment of the present invention may be modified. Some configurations or features of one embodiment may be included in another embodiment or substituted with corresponding configurations or features of another embodiment.

In this disclosure, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other network nodes. 'Base station (BS)' may be substituted with terms such as fixed station, Node B, eNode B (eNB), access point (AP) and the like. The term 'base station' may be used as a concept including a cell or sector in this disclosure. Relay may be substituted with terms such as relay node (RN), relay station (RS) and the like. 'Terminal' may be substituted with terms such as user equipment (UE), mobile station (MS), mobile subscriber station (MSS), subscriber station (SS) and the like.

Specific terms used in the following description may be provided to help the understanding of the present invention. Use of the specific term may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terms disclosed in this document may be supported by the above standard documents.

The following description of embodiments of the present invention may be applied to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMax), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink (hereinafter abbreviated) DL and SC-FDMA in uplink (hereinafter abbreviated UL). LTE-A (LTE-Advanced) is an evolved version of 3GPP LTE. WiMAX may be explained by IEEE 802.16e (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention is not limited The structure of a downlink wireless frame will be described with reference to FIGS. 1 and 2.

In a cellular OFDM wireless packet communication system, uplink/downlink data packet transmission is performed in units of a subframe, and one subframe is defined as a predetermined time duration including a plurality of OFDM symbols. A 3GPP LTE standard supports a type 1 radio frame structure, which can be applied to FDD (Frequency Division Duplex) and also supports a type 2 radio frame structure, which can be applied to TDD (Time Division Duplex).

FIG. 1 illustrates the structure of a type 1 radio frame. A downlink radio frame consists of 10 subframes, and one subframe consists of 2 slots in a time domain. The time taken for transmission of one subframe is referred to as TTI (transmission time interval) and, for example, the length of one subframe may be equal to 1 ms, and the length of one slot may be equal to 0.5 ms. One slot includes a plurality of OFDM symbols in a time domain and includes a plurality of Resource Blocks (RBs) in a frequency domain.

The number of OFDM symbols included in one slot may vary depending upon the configuration of a CP (Cyclic Prefix). The CP may be divided into an extended CP and a normal CP. For example, in the case in which the OFDM symbol is configured of a normal CP, the number of OFDM symbols included in one slot may be equal to 7. In the case in which the OFDM symbol is configured of an extended CP, since the length of an OFDM symbol is increased, the number of OFDM symbols included in one slot is smaller than when the OFDM symbol is configured of a normal CP. In case of the extended CP, for example, the number of OFDM symbols included in one slot may be equal to 6. In the case in which the user equipment is moving at high speed, or in case the channel status is unstable, the extended CP may be used in order to further reduce inter-symbol interference.

In case of the usage of a normal CP, since one slot includes 7 OFDM symbols, one subframe includes 14 OFDM symbols. At this point, the first 2 or 3 OFDM symbols of each subframe are allocated to a PDCCH (physical downlink control channel), and the remaining OFDM symbols may be allocated to a PDSCH (physical downlink shared channel).

Figure 2:
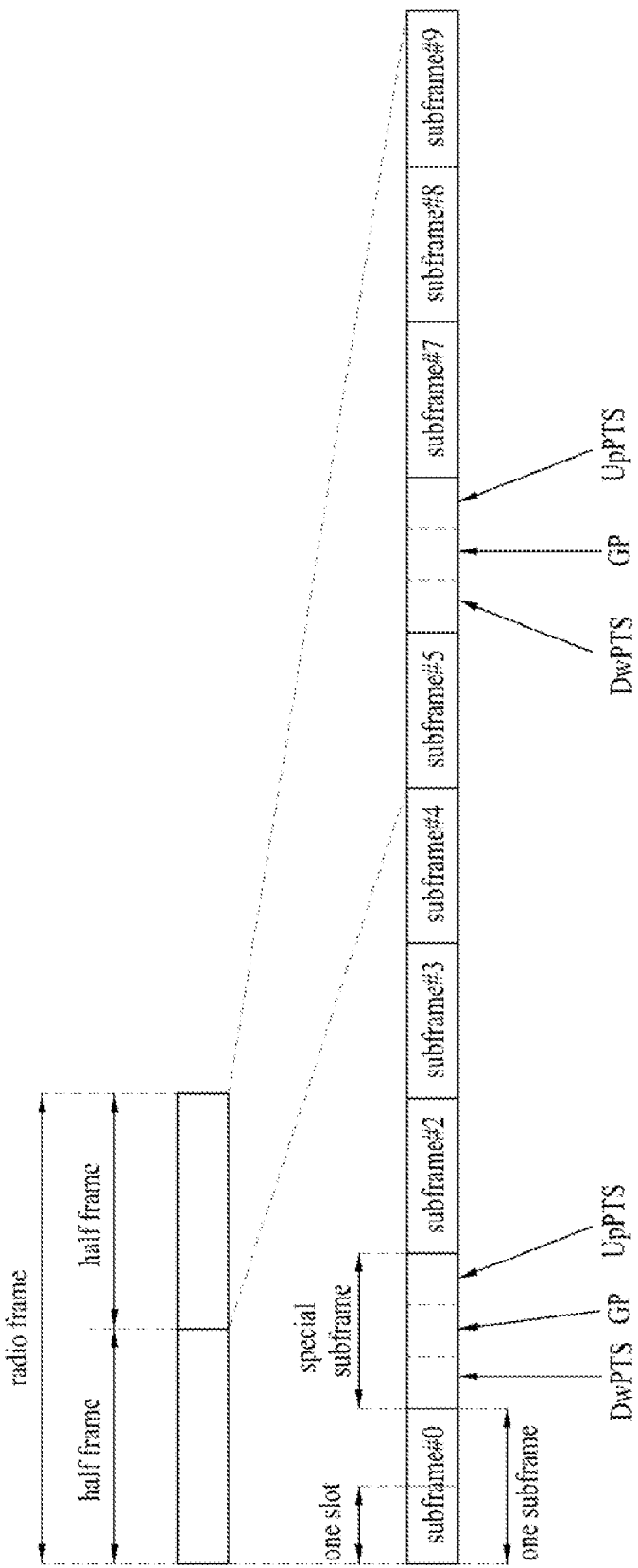
FIG. 2 illustrates a structure of a type 2 wireless frame.

FIG. 2 illustrates a structure of a type 2 wireless frame. A type 2 radio frame is composed of two half frames, and each frame includes five subframes. Subframes may be classified into a normal subframe and a special subframe. The special subframe is a subframe which includes three fields of a downlink pilot time slot (DwPTS), a gap period (GP), and an uplink pilot time slot (UpPTS). The length of these three fields may be individually set, but the total length of the three fields should be 1 ms. One frame includes two slots. That is, regardless of the type of the radio frame, one subframe includes two slots.

The structure of the radio frame is merely exemplary. Therefore, the number of subframes included in the radio frame or the number of slots included in a subframe, and the number of symbols included in one slot may be varied.

Figure 3:
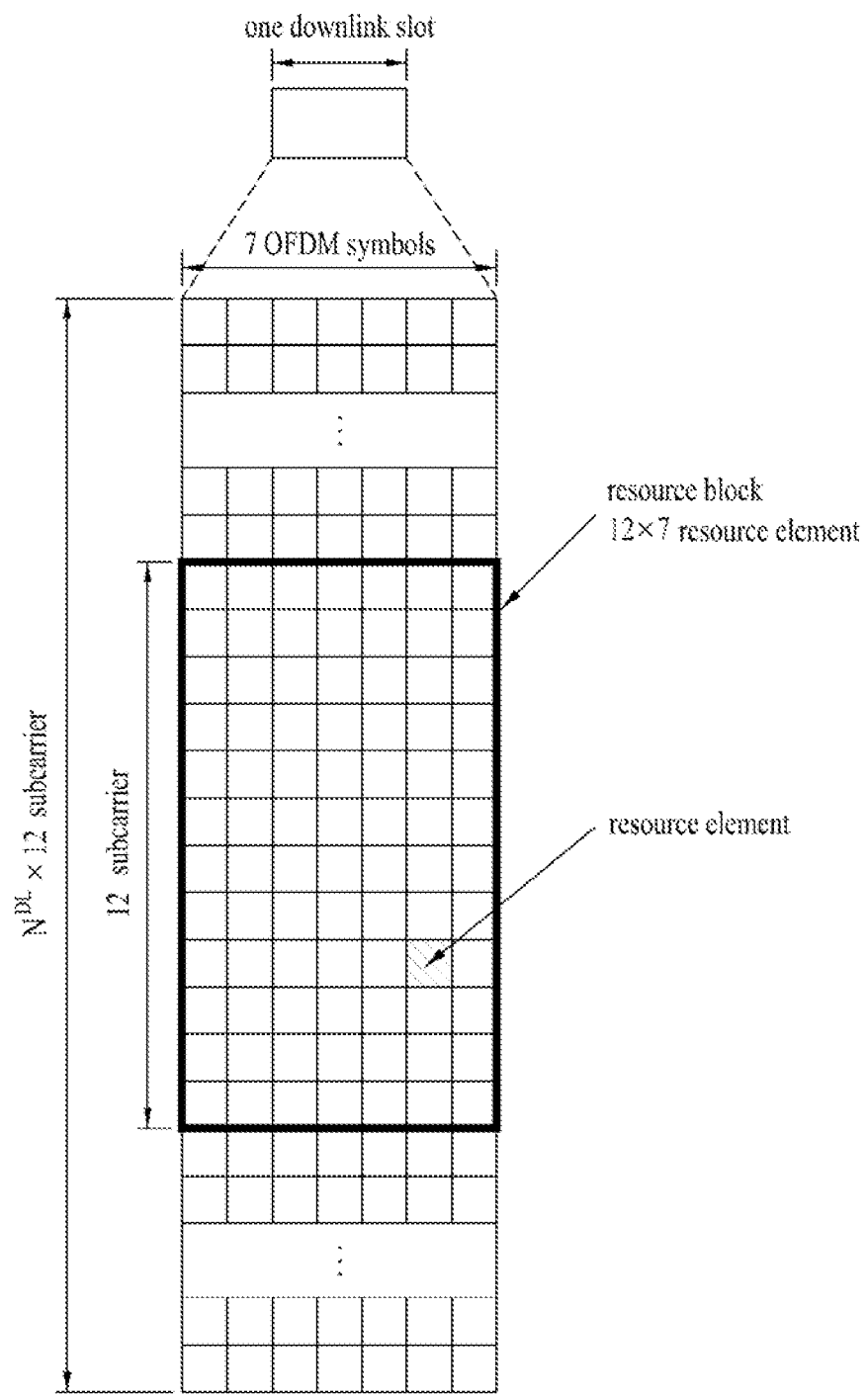
FIG. 3 illustrates an example of a resource grid for one downlink slot.

FIG. 3 illustrates an exemplary drawing of a resource grid of a downlink slot. This corresponds to when the OFDM symbol is configured of a normal CP. Referring to FIG. 3, one downlink slot includes a plurality of OFDM symbols in the time domain and includes a plurality resource blocks (RBs) in the frequency domain. Herein, although it is shown that one downlink slot includes 7 OFDM symbols in the time domain, and that one resource block (RB) includes 12 sub-carriers in the frequency domain, this is merely exemplary. Therefore, the present invention will not be limited only to the example presented herein. Each element within the resource grid is referred to as a resource element (RE). For example, the resource element a(k,1) corresponds to a resource element located in the $k^{th}$ subcarrier and the first OFDM symbol. In case a normal CP, one resource block includes 12×7 resource elements. Since the interval between each subcarrier is 15 kHz, one resource block includes approximately 180 kHz in the frequency domain. $N^{DL}$ corresponds to a number of resource blocks included in a downlink slot. The value of $N^{DL}$ be decided in accordance with a downlink transmission bandwidth determined by the scheduling of the base station.

Figure 4:
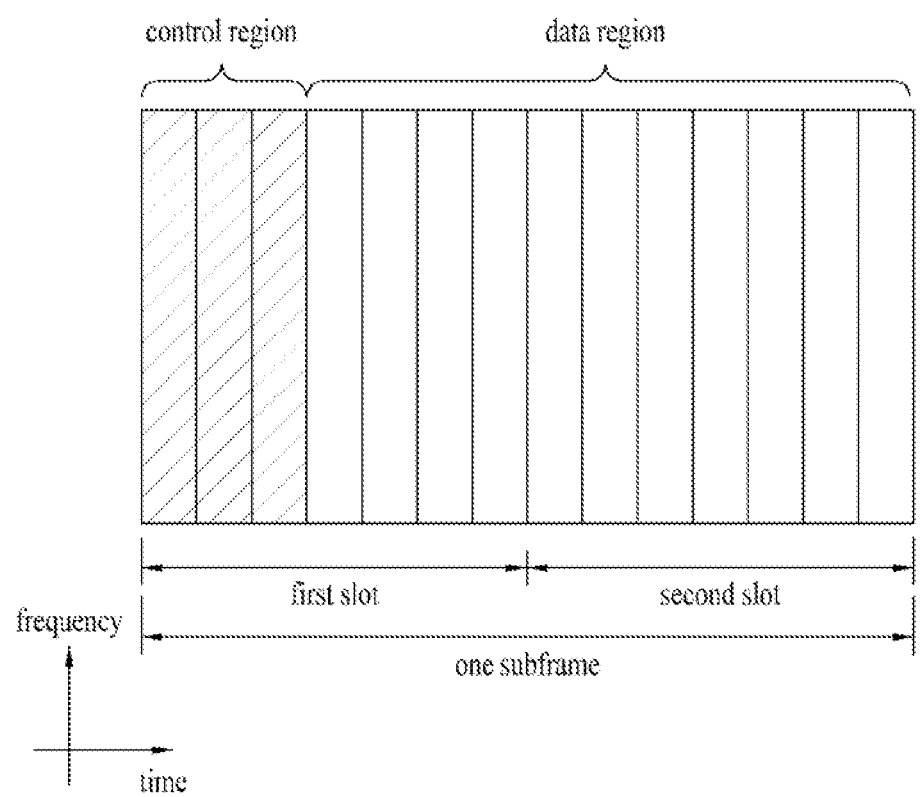
FIG. 4 illustrates a structure of a downlink subframe.

FIG. 4 is a drawing showing a structure of a downlink subframe. In a subframe, a maximum of 3 OFDM symbols located at the front portion of a first slot within one subframe corresponds no a control region wherein a control channel is allocated (or assigned). The remaining OFDM symbols correspond to a data region wherein a Physical Downlink Shared Channel (PDSCH) assigned. Downlink control channels that are being used in the 3GPP LTE system may include a Physical Control Format Indicator Channel (PCFICH), a Physical Downlink Control Channel (PDCCH), a Physical Hybrid automatic repeat request Indicator Channel (PHICH), and so on. The PCFICH includes information on the number of OFDM symbols being transmitted from the first OFDM symbol of a subframe and being used in the control channel transmission within the subframe. As a response to uplink transmission, the PHICH includes HARQ ACK/NACK signals. The control information being transmitted through the PDCCH is referred to as Downlink Control information (DCI). Herein, the DCI may include uplink or downlink scheduling information or may include an uplink transmission power control command on a random terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set of transmission power control commands on individual user equipments within the random user equipment group, transmission power control information, information on the activation of Voice over IP (VoIP), and so on A plurality of PDCCHs may be transmitted within the control region. The user equipment may monitor the plurality of PDCCHs. Herein, the PDCCH may be transmitted in the form of a combination of at least one or more consecutive Control Channel Elements (CCEs). A CCE corresponds to a logical allocation unit used for providing a PDCCH at a coding rate based on a wireless channel state. Herein, the CCR corresponds to a plurality of resource element groups. The number of formats and available data bits of a PDCCH may be decided based upon a correlation between the number of CCEs and the coding rate provided by the CCEs. The base station decides a PDCCH format in accordance with the DCI being transmitted to the user equipment and adds a Cyclic Redundancy Check (CRC) to the control information. Depending upon the owner or purpose of the PDCCH, the CRC may be masked by a Radio Network Temporary Identifier (RNTI). If the PDCCH belongs to a particular (or specific) user equipment, a cell-RNTI (C-RNTI) identifier of the user equipment may be masked to the CRC. Alternatively, if the PDCCH belongs to a paging message, a Paging Indicator Identifier (P-RNTI) may be masked to the CRC. If the PDCCH belongs to system information (more specifically, a system information block (SIB)), a system information identifier, and a system information RNTI (SI-RNTI) may be masked to the CRC. In order to indicate the random access response, which corresponds to a response to the transmission of a random access preamble, of the user equipment, a random access RNTI (RA-RNTI) may be masked to the CRC.

Figure 5:
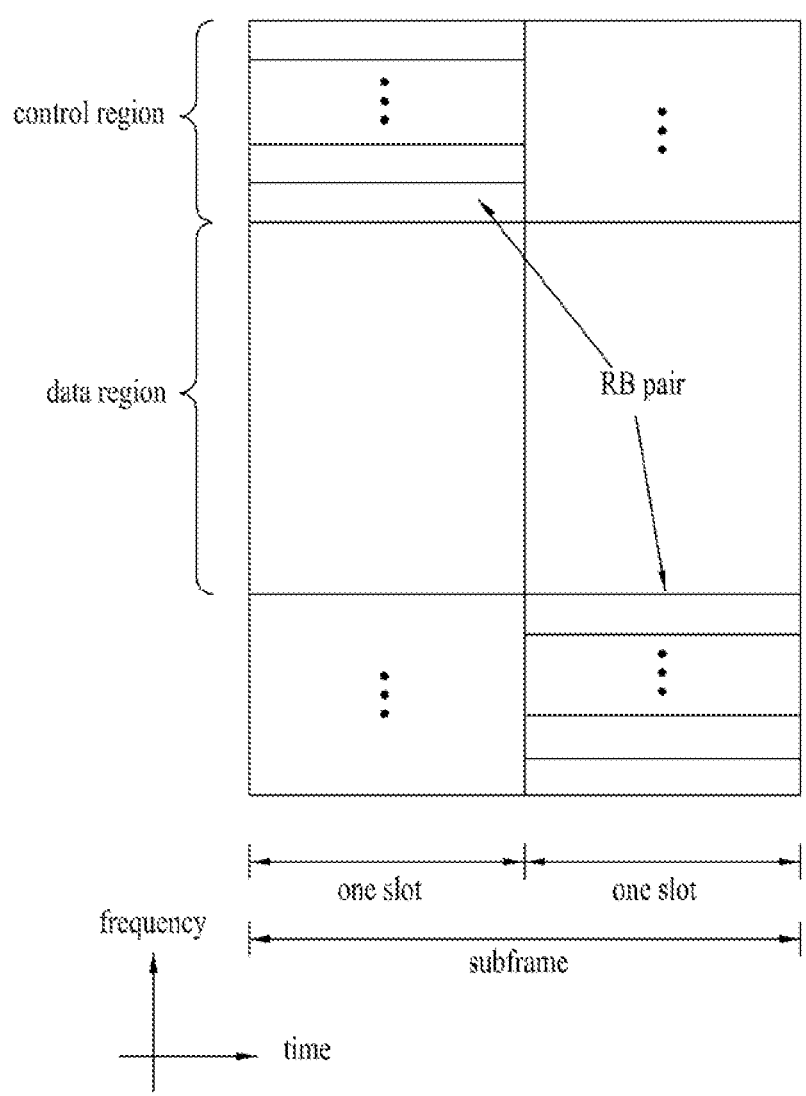
FIG. 5 illustrates a structure of an uplink subframe.

FIG. 5 illustrates a structure of an uplink subframe. The uplink subframe may be divided into a control area and a data area in the frequency domain. A Physical Uplink Control Channel (PUCCH) including uplink control information is allocated to the control area. A Physical Uplink Shared Channel (PUSCH) including user data is allocated to the data area. The PUCCH may be used for three purposes, namely, transmission of ACK/NACK for the PDSCH, transmission of a channel quality indicator (CQI) for frequency area scheduling the PDSCH, and PUSCH transmission resource request (scheduling request). The CQI information bit may include one or more fields. For example, the CQI information bit may include a CQI field indicating the CQI index for determining a modulation and coding scheme (MCS), a precoding matrix indicator (PMI) field indicating the index of the precoding matrix on the codebook, a rank indicator (RI) field indicating the rank, etc.

In order to maintain single carrier properties, one UE does not simultaneously transmit the PUCCH and the PUSCH. A PUCCH associated with one UE is allocated to an RB pair in a subframe. RBs belonging to the RB pair occupy different subcarriers in two slots. That is, the RB pair allocated to the PUCCH is "frequency-hopped" at a slot boundary.

MIMO System

FIG. 6 illustrates a block view showing the structure of a wireless communication system having multiple antennas. As shown in FIG. 6(*a*), if the number of transmit antennas is increased to $N_T$, and if the number of receive antennas is increased to $N_R$, unlike in the case wherein multiple antennas are used only in the transmitter or the receiver, a logical channel transmission capacity increases in proportion with the number antennas. Therefore, transmission rate may be enhanced and frequency efficiency may be drastically improved. In accordance with the increase in the channel transmission capacity, the transmission rate may be theoretically increased as much as a value of a maximum transmission rate ($R_o$) using a single antenna multiplied a rate increase ratio ($R_1$).

$$R_1 = \min(N_T, N_R)$$ Equation 1

For example, a MIMO Communication system using 4 transmit antennas and 4 receive antennas may theoretically gain a transmission rate 4 times greater than that of a single antenna system. After the theoretical capacity increase of a multi-antenna system was proved in the mid 90s, diverse technologies for realizing a substantial enhancement in the data transmission rate is still under active research and development. Moreover, some of the technologies are already being reflected and applied in diverse standards in wireless communication, such as 3rd generation mobile communications, next generation wireless LAN, and so on.

Referring to the trend in the many researches on multi-antenna technology up to the most recent research, research and development on a wide range of perspectives have been actively carried out, wherein the fields of research include research in the aspect of information theory associated with multi-antenna communication capacity calculation, research in wireless channel measurement and drawing out models, research into time-spatial signal processing technology for enhancing transmission reliability and enhancing transmission rate, and so on, in diverse channel environments and multiple access environments.

A communications method in a multi antennas system using mathematical modeling will now be described in detail. Herein, it is assumed that there are $N_T$ transmit antennas and $N_R$ receive antennas in the system.

Referring to a transmitted signal, when there are NT transmit antennas, the maximum number of transmittable information is NT. The transmission information may be expressed as shown below.

$$s = [s_1, s_2, \ldots, s_{N_T}]^T$$ Equation 2

Each of the transmission information $s_1, s_2, \ldots, s_{N_T}$ may have a different transmission power. When each of the transmission power is referred to as $P_1, P_2, \ldots, P_{N_T}$, the transmission information with adjusted respective transmission power may be expressed as shown below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ Equation 3

Moreover, by using a diagonal matrix P of the transmission power, S may be expressed as shown below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Herein, consideration is made on a case wherein $N_T$ actually transmitted signals $x_1, x_2, \ldots, x_{N_T}$ are configured by having a weight matrix W applied to an information vector S with adjusted transmission power. The weight matrix W performs the role of adequately distributing transmission information to each antenna in accordance with the transmission channel status. By using a vector X, $x_1, x_2, \ldots, x_{N_T}$ may be expressed as shown below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Here, $w_{ij}$ represents a weight between an $i^{th}$ transmit antenna and $j^{th}$ information. W may also be referred to as a precoding matrix.

When there are $N_R$ receive antennas, the received signals $y_1, y_2, \ldots, y_{N_R}$ of each of the receive antennas may be expressed as a vector as shown below.

$$y = [y_1, y_2, \ldots, y_{N_R}]^T \quad \text{Equation 6}$$

In case of modeling a channel in a multi-antenna wireless communication system, a channel may be identified in accordance with a transmitting and receive antenna index. Herein, a channel passing through receive antenna i from transmit antenna j will be expressed as $h_{ij}$. In $h_{ij}$, it should be noted that, in the index order, the receive antenna index comes first, and the transmit antenna index comes next.

FIG. 6(b) illustrates a channel from $N_T$ transmit antennas to receive antenna i. The channel may be grouped so as to be expressed in the form of a vector and a matrix. In FIG. 6(b), a channel starting from a total of $N_T$ transmit antennas and being received, by receive antenna i may be expressed as shown below.

$$h_i^T = [h_{i1}, h_{i2}, \ldots, h_{iN_T}] \quad \text{Equation 7}$$

Therefore, all channels starting from $N_T$ number of transmit antennas and being received by $N_R$ receive antennas may be expressed as shown below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{Equation 8}$$

An actual channel passes through a channel matrix H, and an AWGN (Additive White Gaussian Nose) is added. The AWGN $n_1, n_2, \ldots, n_{N_R}$ being added to each of the $N_R$ receive antennas may be expressed as shown below.

$$n = [n_1, n_2, \ldots, n_{N_R}]^T \quad \text{Equation 9}$$

A received signal may be expressed as shown below through the above-described equation model.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{Equation 10}$$

Equation 5

-continued $$Hx + n$$

The number of rows and columns in a channel matrix H indicating the channel state may be decided by the number of transmit and receive antennas. The number of rows in the channel matrix H is equal to the number of receive antennas $N_R$, and the number of columns in the channel matrix H is equal to the number of transmit antennas $N_T$. More specifically, the channel matrix H corresponds to a matrix of $N_R \times N_T$.

A rank of a matrix is defined as a minimum number among the number of rows or columns that are independent from one another. Therefore, the rank of a matrix cannot be greater than the number of rows or the number of columns. The rank rank(H), of the channel matrix H is limited as shown below.

$$\text{rank}(H) \leq \min(N_T, N_R) \quad \text{Equation 11}$$

The rank of a matrix may also be defined as the number of non-zero eigenvalues, when the matrix is decomposed by Eigenvalue Decomposition (EVD). Similarly, the rank of a matrix may be defined as the number of nonzero singular values, when the matrix is decomposed by Singular Value Decomposition (SVD). Therefore, the rank of a channel matrix may be the maximum number of different pieces of information that can be transmitted on a physical channel, in its physical meaning.

In MIMO transmission, a 'Rank' represents a number of paths that can independently transmit a signal, and a 'number of layers' indicates a number of signal streams transmitted through each path. Generally, a transmitting end transmits a number of layers corresponding to the number of ranks used in signal transmission. Therefore, unless mentioned differently, rank has the same meaning as the number of layers.

Reference Signal (RS)

In a wireless communication system, a packet is transmitted on a radio channel. In view of the nature of the radio channel, the packet may be distorted during transmission. To receive the signal successfully, a receiver should compensate for distortion of the received signal using channel information. Generally, to enable the receiver to acquire the channel information, a transmitter transmits a signal known to both the transmitter and the receiver and the receiver acquires knowledge of channel information based on distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

In a mobile communication system, a reference signal may be broadly divided into two types. The first type is an RS for obtaining channel information and the other type is an RS for demodulating data.

Since the purpose of the RS for obtaining channel information is in obtaining downlink channel information by the terminal, the transmission should be performed in wideband, and even a terminal, which does not receive downlink data in a specific subframe, should be able to receive and measure this RS. Further, the RS for obtaining channel information may also be used to measure handover, etc.

The RS for data demodulation is transmitted with data when the base station transmits downlink data, and the terminal may perform channel estimation by receiving the RS, and demodulate data using the estimated channel. The RS should be transmitted together to the area in which data is transmitted.

In a conventional wireless communication system (e.g., an LTE release-8 system), in the case of downlink reference signals, two kinds of reference signals are defined for a unicast service. One is a common reference signal (CRS) which is shared by all terminals, and the other is a dedicated reference signal (DRS) for a specific terminal. Information for channel estimation and data demodulation may be provided by such reference signals.

A receiver (i.e. a UE) may feed back a channel quality-related indicator such as a Channel Quality indicator (CQI), a Precoding Matrix Indicator (PMI), and/or a Rank Indicator (RI) to a transmitter (base station) by estimating channel states using CRSs. A CRS is also called a cell-specific RS. The CRS may be used for two purposes of acquisition of channel information and channel estimation for data demodulation. The CRS is transmitted for every subframe in wideband.

Further, the DRS may be transmitted through the RE in the case in which data demodulation on the PDSCH is necessary. A higher layer may notify a UE (terminal) as to whether a DRS exists and may also notify the UE that the DRS is valid only when a related. PDSCH is mapped. A DRS is also called a UE-specific RS or Demodulation Reference. Signal (DMRS). The DRS may be used for only the purpose of channel estimation for data demodulation.

FIG. 7 illustrates patterns in which CRSs and DRSs are mapped to a downlink RB, as defined in a conventional 3GPP LTE system (e.g. conforming to Release-8). One resource block is defined as 12 subcarriers in one slot x frequency, and a downlink resource block pair as a unit, to which reference signals are mapped, may be expressed as a unit of 12 subcarriers in one subframe x frequency. That is, an RB includes 14 OFDM symbols in time in case of a normal CP (see FIG. 7(a)) and 12 OFDM symbols in time in case of an extended CP (see FIG. 7(b)).

In FIG. 7, the positions of RSs in time-frequency resources in a system where an eNB supports four Tx antennas are illustrated. Reference numerals 0, 1, 2 and 3 denote the positions of CRSs for first to fourth antenna ports, antenna port 0 to antenna port 3, respectively, and reference character D denotes the positions of DRSs.

CRSs will first be described below in detail.

CRSs are configured in various manners depending on the configuration of antennas at a transmitter (i.e. an eNB). The 3GPP LTE system (e.g. conforming to Release-8) supports a variety of antenna configurations and downlink transmitters (i.e. eNBs) have three antenna configurations; 1-Tx, 2-Tx and 4-Tx. In 1-Tx transmission, an eNB allocates an RS for a single antenna port. In 2-Tx transmission, the eNB allocates RSs for two antenna ports in Time Division Multiplexing (TDM) and/or Frequency Division Multiplexing (FDM). That is, RSs for two antenna ports are allocated to different time resources and/or different frequency resources and thus distinguished from each other by time and/or frequency. In 4-Tx transmission, the eNB allocates RSs for four antenna ports in TDM/FDM. Channel information that a downlink receiver (i.e. a UE) estimates from CRSs may be used for demodulation of data transmitted in a transmission scheme such as single antenna transmission, transmit diversity, closed-loop spatial multiplexing, open-loop spatial multiplexing, Multi-User MIMO (MU-MIMO), etc.

When multiple antennas are supported, an antenna port transmits an RS on predetermined REs according to an RS pattern, while transmitting no signal on REs designated for the other antenna ports. When the CRS is mapped on the time-frequency resources, in one OFDM symbol, the CRS for one antenna port on the frequency is mapped to one resource element (RE) for 6 REs, and is then transmitted. One resource block includes 12 REs, and thus the RE, in which the CRS for one antenna port is transmitted, becomes two REs in one OFDM symbol in one resource block.

Specifically, CRSs are mapped in the time-frequency resources according to the following rule described as Equation 12.

$$k = 6m + (v + v_{shift}) \bmod 6 \qquad \text{Equation 12}$$

$$l = \begin{cases} 0, & N_{symb}^{DL} - 3 \text{ if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k denotes a subcarrier index, l denotes a symbol index and p denotes an antenna port index. $N_{symb}^{DL}$ denotes the number of OFDM symbols of one downlink slot, $N_{RB}^{DL}$ denotes the number of resource blocks allocated to downlink, $n_S$ denotes a slot index, and $N_{ID}^{cell}$ denotes a cell ID. "mode" denotes a modulo operation. In the frequency domain, the positions of RSs depend on the value of $V_{shift}$, and $V_{shift}$ in turn depends on the cell ID. Therefore, the positions of RSs have different frequency shift values in different cells.

To increase channel estimation performance using CRSs, the positions of CRSs of each cell may be shifted along the frequency axis by a frequency shift value specific to the cell, so that different cells have CRSs at different positions. For example, when an RS is positioned every three subcarriers, one cell may allocate an RS to subcarrier 3k, whereas another cell may allocate an RS to subcarrier (3k+1). For one antenna port, an RS is allocated to every 6 REs (i.e. 6-subcarrier spacing) in the frequency domain, apart from an RE to which an RS is allocated for another antenna port by three REs.

Power boosting may be applied to CRSs. Power boosting refers to transmission of an RS with higher power than originally allocated to an RE for the RS by lowering the power of a non-RS RE.

In the time domain, RSs are positioned at every predetermined interval in the time domain, starting from symbol 0 (1=0) in each slot. The interval varies with CP length. RSs are positioned in symbols 0 and 4 in a slot of a subframe with a normal CP, and RSs are positioned in symbols 0 and 3 in a slot of a subframe with an extended CP. For one OFDM symbol, only RSs for up to two antenna ports are defined. Therefore, in 4-Tx transmission, RSs for antenna port 0 and antenna port 1 are positioned in symbol 0 and symbol 4 (in symbol 0 and symbol 3 in a subframe with an extended CP) and RSs for antenna port 2 and antenna port 3 are positioned in symbol 1 in a slot. Note that the frequency positions of the RSs for antenna port 2 and antenna port 3 are exchanged in a second slot.

Now a detailed description will be given of DRSs.

A DRS (or a UE-specific RS) is used for data demodulation. For transmission through multiple antennas, precoding weights for a particular UE are still applied to RSs such that when the UE receives the RSs, it may estimate equivalent channels in which the precoding weights applied to the respective Tx antennas are combined with transmission channels.

The conventional 3GPP LTE system (e.g. conforming to Release-8) supports transmission through up to four Tx antennas and defines a DRS for rank-1 beamforming. The DRS for rank-1 beamforming is represented as an RS for antenna port 5. The DRS is mapped to an RB according to Equation 13 in case of a normal CP and according to Equation 14 in case of an extended CP.

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

Equation 13

-continued $$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

Equation 14

In equations 13 and 14, k is a subcarrier index, 2 is a symbol index, and p is an antenna port index. $N_{SC}^{RB}$ is the size of a resource block in a frequency domain, and is expressed as the number of subcarriers $n_{PRB}$ is the physical resource block number. $N_{RB}^{PDSCH}$ is the bandwidth of the resource block of PDSCH transmission. $n_S$ is a slot index, and $N_{ID}^{cell}$ is a cell ID. Mod is a modulo operation. The position of an RS in the frequency domain depends on the value of $V_{shift}$. $V_{shift}$ in turn depends on the cell ID. Therefore, the positions of RSs have different frequency shift values in different cells.

In order to support a spectral efficiency higher than the conventional 3GPP LTD (e.g., a release-8) system, a system having an extended antenna configuration (e.g., an LTE-A system) may be designed. The extended antenna may include, for example, 8 transmission antennas. In the conventional LTE system, downlink reference signals have been defined only for a maximum of four antenna ports, and thus in the case in which an eNB has 4 to 8 downlink transmission antennas in the LTE-A system, reference signals for these antenna ports should be additionally defined and designed. Likewise, for reference signals for a maximum of 8 transmission antenna ports, both kinds of reference signal, which are a reference signal for channel measurement and a reference signal for data demodulation, need to be defined.

In a system having such an extended antenna configuration, UEs, which are operated in the conventional antenna configuration, need to be supported. That is, backward compatibility needs to be supported. Hence, the reference signal pattern according to the conventional antenna configuration needs to be supported, and a new reference signal pattern for an additional antenna configuration needs to be designed. Here, in the case in which the CRS for a new antenna port is defined to be transmitted in all bands for every subframe as in a system having the conventional antenna configuration, the reference signal overhead rapidly increases, thereby lowering the data transmission rate. In consideration of the above, the LTE-A system may design a new reference signal for an extended antenna port.

RSs, which are newly introduced in the LIE-A system, may be broadly classified into two types. One type is a demodulation RS (DM RS) for demodulating data transmitted through a maximum of transmission antennas. In the case in which the dedicated DM RS is transmitted to the UE in which data transmission is scheduled. The UE-dedicated DM RS may be designed to be transmitted only in the time-frequency domain in which data for the UE is transmitted, that is, the resource area in which the UE is scheduled. The other type is a channel state information RS (CSI-RS) for measuring the channel for selection of a transmission rank, a modulation and coding scheme (MCS), a precoding matrix index (PMI), etc.

The CSI-RS for measuring the channel is designed for channel measurement unlike the CRS of the conventional LIE system which is used for data demodulation as well as channel measurement, handover, etc. Of course, the CSI-RS may also be used for measurement of handover, etc. Since the CSI-RS is transmitted only for obtaining information on channel state, the CSI-RS does not need to be transmitted for every subframe unlike the CRS of the conventional LTE system. In order to reduce overhead of the CSI-RS, the CSI-RS may be designed to be intermittently (e.g., periodically) transmitted in the time axis.

Figure 8:
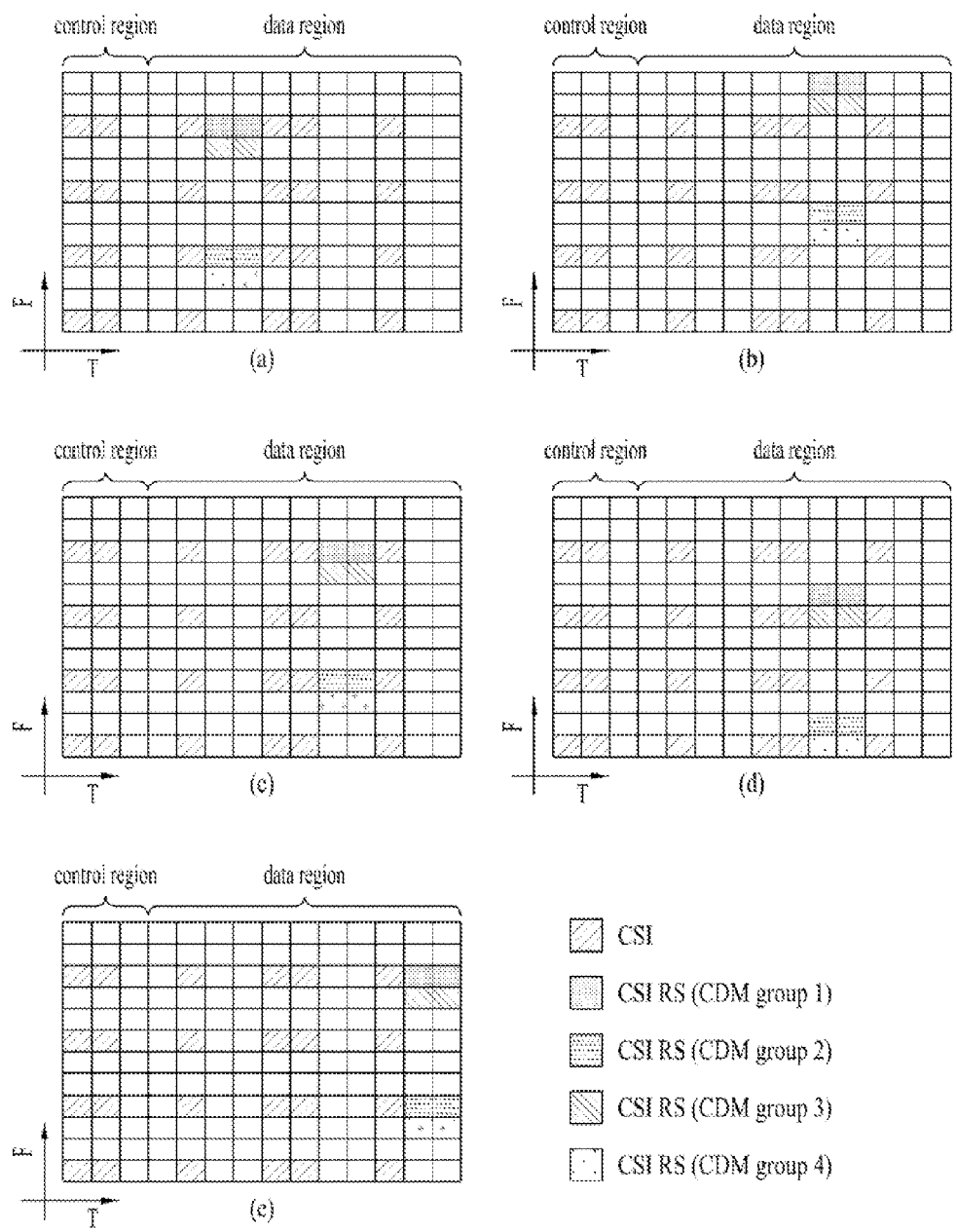
FIG. 8 illustrates a CSI-RS pattern defined in an LTE-A system.

FIG. 8 illustrates examples of a CSI-RS pattern defined in an LTE-A system. FIG. 8 shows the locations of resource elements in which the CSI-RS is transmitted in one resource block pair in which downlink data is transmitted (in the case of a normal CP, 14 OFDM symbols in time×12 subcarriers in frequency). In a specific downlink subframe, one CSI-RS pattern may be used among FIGS. 8(a) to 8(e). The CSI-RS may be transmitted for 8 antenna ports (e.g., antenna port indexes 15, 16, 17, 18, 19, 20, 21, and 22) which are additionally defined in the LTE-A system. The CSI-RS for different antenna ports may be positioned in different frequency resources (subcarriers) and/or different time resources (OFDM symbols) (i.e., may be multiplexed via FDM and/or TDM). Further, CSI-RSs for different antenna ports, which are located in the same-frequency resource, may be divided by orthogonal codes each other (that is, may be multiplexed via CDM). In the example of FIG. 8(a), CSI-RSs for antenna ports 15 and 16 may be positioned in resource elements (RE), which are displayed as CSI-RS CDM group 1, and may be multiplexed by the orthogonal codes. In the example of FIG. 8(a), the CSI-RSs for antenna ports 17 and 18 may be positioned in the resource elements displayed as CSI-RS CDM group 2, and may be multiplexed by the orthogonal codes. In the example of FIG. 8(a), the CSI-RSs for antenna ports 19 and 20 may be positioned in the resource elements displayed as CSI-RS CDM group 3, and may be multiplexed by the orthogonal codes. In the example of FIG. 8(a), the CSI-RSs for antenna ports 21 and 22 may be positioned in the resource elements displayed as CSI-RS CDM group 4, and may be multiplexed by the orthogonal codes. The principle, which has been explained on the basis of FIG. 8(a), may also be applied to FIGS. 8(b) to 8(e).

RS patterns, which have been explained with reference to FIGS. 7 and 8, are merely exemplary, and the present invention is not limited to a specific RS pattern when applying various embodiments. That is, even in the case in which RS patterns, which are different from those in FIGS. 7 and 8, are defined and used, various embodiments of the present invention may be applied in the same manner.

Cooperative Multi-Point (CoMP)

A single-cell MIMO operation may be divided into a single-user MIMO (SU-MIMO) scheme, in which one UE receives a downlink signal in one cell, and a multi-user MIMO (MU-MIMO) scheme, in which two or more UES receive a downlink signal in one cell.

Further, in a multi-cell environment, a UE, which is located at a cell-edge, may experience interference by signals from a plurality of eNBs. It is known that Inter-Cell Interference (ICI) generally degrades the performance of a UE at a cell edge and average sector throughput in a multi-cellular environment with a frequency reuse factor of 1. To offer appropriate throughput performance to a cell-edge UE in an environment constrained by interference, a simple ICI mitigation technique such as UE-specific power control-based Fractional Frequency Reuse (FFR) is used in the conventional LTE system. However, it may be preferred to reduce the ICI or reuse the ICI as a desired signal for the UE, rather than to decrease the utilization of frequency resources per cell. For this purpose, CoMP transmission techniques may be adopted.

The CoMP communication technology may also be expressed as co-MIMO, collaborative MOMO or network MIMO, etc. CoMP technology enhances the performance of the UE located at the cell edge and enhances average sector throughput, and thus by applying CoMP technology, inter-cell interference may be reduced in the multi-cell environment and overall system performance may be improved.

FIG. 9 conceptually illustrates the CoMP operation of an intra eNB and an inter eNB.

Referring to FIG. 9, an intra eNB 110 and 120 and an inter eNB exist in a multi-cell environment. In the LIE system, an intra eNB includes several cells (or sectors). Cells, which belong to an eNB to which a specific UE belongs, have an intra eNB 110 and 120 relation with a specific UE. That the cells, which share the same eNB with its own cell to which the UE belongs, correspond to intra eNBs 110 and 120, and the cells, which belong to another eNB, correspond to the inter eNB 130. Likewise, the cells intra eNB), which share the same eNB as the basis with a specific UE, may exchange information (e.g., data, channel state information (CSI)) without a separate interface between schedulers of each cell, but, the cells, which use another eNB as the basis, may exchange information between cells through the backhaul 140, etc. s illustrated in FIG. 9, the single-cell MIMO user 150 in the single cell may communicate with one serving eNB in one cell (cell A, cell B, cell D, or cell E), and the multi-cell MIMO user 160 at the cell-edge may communicate with multiple serving eNBs in a multi-cell (cell A & cell B, or cell B & cell C & cell D).

Downlink CoMP schemes are classified largely into Joint Processing (JP), and Coordinated Scheduling/Beamforming (CS/CB).

According to the JP scheme, each point (eNB) of a CoMP cooperation unit may use data. The CoMP cooperation unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP cooperation unit) at one time. That is, a plurality of transmission points may simultaneously transmit data to a single UE. The joint transmission scheme can improve the quality of a received signal coherently or non-coherently and actively eliminate interference to other UEs, as well.

Dynamic cell selection is a technique of transmitting a PDSCH from one point of a CoMP cooperation unit at one time. That is, one point of the CoMP cooperation unit transmits data to a single UE at a given time point, while the other points of the CoMP cooperation unit do not transmit data to the UE at the time point. A point to transmit data to a UE may be dynamically selected.

Meanwhile, in the CS/CB scheme, a CoMP cooperation unit may perform cooperative beamforming for data transmission to a single UE. While only a serving cell transmits data to the UE, user scheduling/beamforming may be determined through coordination among cells of the CoMP cooperation unit.

Uplink CoMP reception refers to uplink reception of a transmitted signal through coordination at a plurality of geographically separated points. Uplink CoMP schemes include Joint Reception (JR) and Coordinated Scheduling/Beamforming (CS/CB).

In JR, a plurality of reception points receive a signal transmitted on a PUSCH. CS/CB is a technique in which, while only one point receives a PUSCH, user scheduling/beamforming is determined through coordination among cells of a CoMP cooperation unit.

Channel State Information (CSI) Feedback.

The MIMO method may be divided into an open-loop scheme and a closed-loop scheme. According to the open loop scheme, MIMO transmission is performed in the transmitting end without feedback of the channel state information from the MIMO receiving end. According to the closed loop MIMO scheme, the CSI is fed back from the MIMO receiving end, and MIMO transmission is performed in the transmitting end. In the closed loop scheme, each of the transmitting end and the receiving end may perform beamforming on the basis of the CSI in order to obtain a multiplexing gain of the MIMO transmission antenna. The transmitting end (eNB) may allocate an uplink control channel or an uplink shared channel to the receiving end (UE) so that the receiving end (UE) may feedback the CSI.

The fed-back CSI may include a rank indicator (RI), a precoding matrix index (PMI) and a channel quality indicator (CQI).

RI is information on channel rank. The rank of the channel means the maximum number of a layer (or a stream) which may transmit different information through the same time-frequency resource. The rank value is mainly determined by long term fading, and thus may be generally fed back according to a longer cycle (i.e., less frequently) compared to the PMI and CQI.

PMI information on a precoding matrix used in transmission from the transmitting end, and is a value which reflects the spatial attributes of the channel. Precoding means mapping a transmission layer to a transmission antenna, and the layer-antenna mapping relation may be determined by the precoding matrix. The PMI corresponds to a precoding matrix index of an eNB, which is preferred by the UE, on she basis of the measured value such as a signal-to-interference plus noise ratio (SINR). In order to reduce feedback overhead of the precoding information, a method of sharing, by the transmitting end and the receiving end, the codebook including several precoding matrixes in advance, and performing feedback only for an index indicating a specific precoding matrix in the codebook, may be used.

CQI is information which indicates channel quality or channel intensity. The CQI may be expressed as a predetermined MCS combination. That is, the CQI index, which is fed back, represents a corresponding modulation scheme and code rate. Generally, the CQI is a value which reflects the received SINR which may be obtained in the case in which the eNB constitutes a spatial channel using the PMI.

Further, in a system that supports an extended antenna configuration (e.g., an LTE-A system), obtaining an additional multi-user diversity using a multi-user MIMO (MU-MIMO) is considered. In the MU-MIMO scheme, an interference channel exists between UEs which are multiplexed in the antenna domain, and thus it necessary to prevent generation of interference for different UEs in the case in which, among multiple users, downlink transmission is performed in an eNB using CSI, which is fed back by one UE. Hence, in order for the MU-MIMO operation to be appropriately performed, CSI of higher accuracy compared to single user MIMO (SU-MIMO) should be fed back.

Likewise, a new CSI feedback scheme, which has improved the CSI composed of the existing RI, PMI and CQI, may be applied so that more accurate channel state information may be measured and reported. For example, the precoding information, which is fed back by the receiving end, may be indicated by the combination of two PMIs. One of the two PMIs (a first PMI) may have a long term and/or wideband attribute, and may be called W1. The other of the two PMIs (a second PMI) may have a short term and/or subband attributes, and may be called W2. The final PMI may be determined by the combination (or function) of W1 and W2. For example, if the final PMI is W, the definition may be W=W1*W2 or W=W2*W1.

Further, with respect to the CQI measurement, the UE may calculate channel state or valid Signal-to-Interference plus Noise Ratio (SINR) using a reference signal. Further, the channel state or valid SINR may be measured in the entire system bandwidth (may be also called set S), or may be measured in the partial bandwidth (specific subband or specific RB). The CQI for the entire system bandwidth (set S) is called wideband (WB) CQI, and the CQI for the partial band is called a subband (SB) CQI. The UE may calculate the uppermost MCS on the basis of the calculated channel state or valid SINR. The highest MCS means an MCS which satisfies an assumption on the CQI calculation while the transmission block error rate does not exceed 10% at the time of decoding. The UE determines a CQI index related to the calculated MCS, and reports the determined CQI index to the eNB.

This channel information reporting may be classified into periodic reporting transmitted periodically and aperiodic reporting transmitted in response to a request made by a base station.

Aperiodic reporting is set for each user equipment by a 1-bit request bit (CQI request bit) contained in UL scheduling information downloaded to a user equipment by a base station. Having received this information, each UE may be then able to deliver channel information to the base station via a physical uplink shared channel (PUSCH) in consideration of transmission mode. It may be able to set RI and CQI/PMI not to be transmitted on the same PUSCH.

In case of the periodic reporting, a period for transmitting channel information via a higher layer signal, an offset in the corresponding period and the like are signaled to each user equipment by subframe units and channel information in consideration of a transmission mode of each user equipment may be delivered to a base station via a physical uplink control channel (PUCCH) in accordance with a determined period. In case that data transmitted in uplink simultaneously exists in a subframe in which channel information is transmitted according to a determined period, the corresponding channel information may be transmitted together with the data not on the physical uplink control channel (PUCCH) but on a physical uplink shared channel (PUSCH). In case of the periodic reporting via PUCCH, bits limited more than those of the PUSCH may be used. RI and CQI/PMI may be transmitted on the same PUSCH. In case that the periodic reporting and the aperiodic reporting collide in the same subframe, only aperiodic reporting can be performed.

CSI Feedback Measured Using CSI-RS

According to the conventional LTE system, the CSI including the RI, PMI and CQI is measured using the CRS transmitted for each subframe, and thus in the case of the periodic CSI transmission through the PUCCH, the CSI for the subband may be measured and reported, reflecting the characteristics of the downlink channel according to the CRS transmitted in each subframe. Further, in the LIE-A system, the CSI including RI, W1, W2 and CQI is measured using the CSI-RS which is intermittently transmitted according to a preset period in the time, and in the case of the periodic report through the PUCCH, the characteristics of the downlink channel according to the recently received CSI-RS may be reflected. At this time, as in the conventional LTE system, when the CSI measurement and report scheme according to the CRS is used, in the case of the CSI for a specific subband, the accuracy, which reflects the characteristics of the current downlink channel, may be lowered as the CSI-RS gets old from the time point in which the CSI-RS has been received. Hence, a new scheme for transmitting and receiving feedback information needs to be defined, and specific embodiments of the present invention thereabout will be described below.

Figure 10:
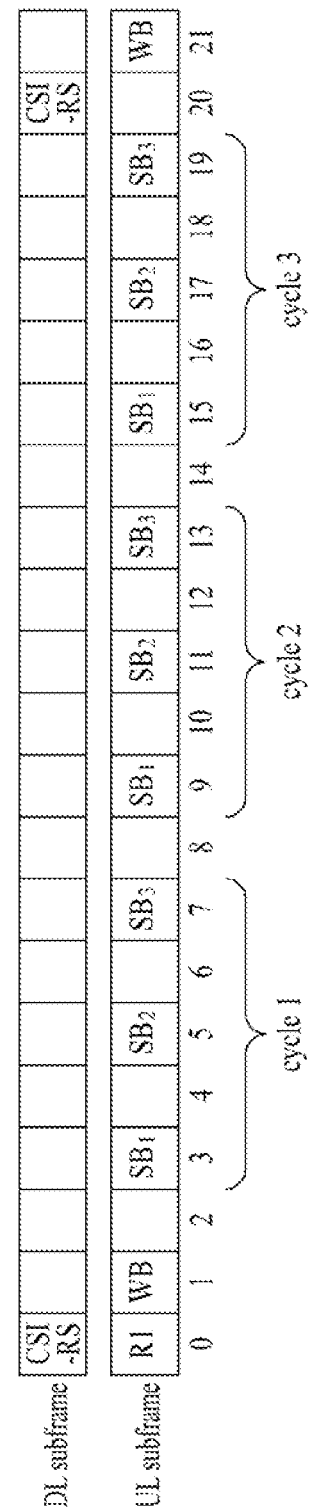
FIG. 10 illustrates an example of downlink channel measurement and report using CSI-RS.

FIG. 10 illustrates an example of a downlink channel measurement and report using CSI-RS.

In FIG. 10, WB refers to wideband CSI. That is, the WB CSI refers to a wideband PMI and/or CQI. In FIG. 10, the SB refers to the subband. CSI. That is, the SB CSI refers to the subband PMI and/or CQI. Further, in FIG. 10, the SBi refers to the CSI of the ith partial subband among the entire bands. For example, in the case in which the entire band includes N subbands, the SB1 refers to the PMI and/or CQI of the first subband, SB2 refers to the PMI and/or CQI of the second subband, and the SBN refers to the PMI and/or CQI of the Nth subband.

Referring to FIG. 10, the CSI (SB1, SB2, SB3) of the downlink subband is transmitted in a period of 2 subframes in the uplink, and the SB CSI has three cycles for one period of the transmission of the CSI (NB) of the wideband (or for one period of the CSI-RS transmission). One cycle of the SB CSI refers to a unit in which SB1, SB2 and SB3 are fed back each time. That is, after one WB CSI is transmitted, the SB CSI is transmitted in the order of SB1, SB2 and SB3 (first cycle), and after the SB CSI cycle is repeated twice more, the WB CSI is transmitted. In other words, the CSI may be fed back three times for each subband for one period of the WE CSI feedback.

FIG. 10 illustrates that the CSI-RS is transmitted in a period of 20 subframes (i.e., 20 ms) in the downlink subframe. It is assumed that the period of the CSI-RS has a longer period than three cycles of the feedback of the SE CSI. The CSI-RS transmission period is exemplary, and the CSI-RS may be transmitted according to a different period.

In the CSI feedback scheme as in FIG. 10, the SB CSI, which is fed back in uplink subframe indexes 3, 5, 7, 9, 11, 13, 15, 17 and 19, is generated on the basis of the channel measured using the CSI-RS received in the downlink subframe index 0. Here, the downlink channel is changed as time passes, and thus the downlink channel state, which is measured on the basis of the CSI-RS received in the downlink subframe index 0, does not accurately reflect the actual downlink channel state at a certain time point after downlink subframe index 0. For example, the accuracy of the CSI on SB1, which is transmitted at the time point of uplink subframe index 9, may be smaller than the accuracy of the CSI on SB1 transmitted at the time point of uplink subframe index 3. That is, SB1 CSI, SB2 CSI, and SB3 CSI are measured and transmitted on the basis of the CSI-RS received in downlink subframe index 0 until the next CSI-RS is received in downlink subframe index 20, and thus the accuracy of SB CSI may be lowered as downlink subframe index 0 gets away therefrom.

Further, In Three cycles of SB CSI transmission, SB1, SB2, and SB3 are transmitted in a fixed order, and thus the accuracy of the CSI is lowered as the order of the SB goes backward. For example, the SB3 CSI, which is fed back in uplink subframes 7, 13 and 19, may have a larger error (i.e., the error of the downlink channel state which is fed back with the actual downlink channel state) compared to SB1 CSI.

Likewise, if the CSI for a specific subband among a plurality of subbands has a larger error compared to the CSI for another subband due to a problem of a feedback procedure, the eNB, which has received such CSI as feedback, may not be able to efficiently use the entire frequency resources. Various embodiments for solving this problem will be described below.

Exemplary Embodiment 1

The present embodiment relates to a scheme for changing the order of the subband in a cyclic shift method for each cycle the SB CSI feedback.

Figure 11:
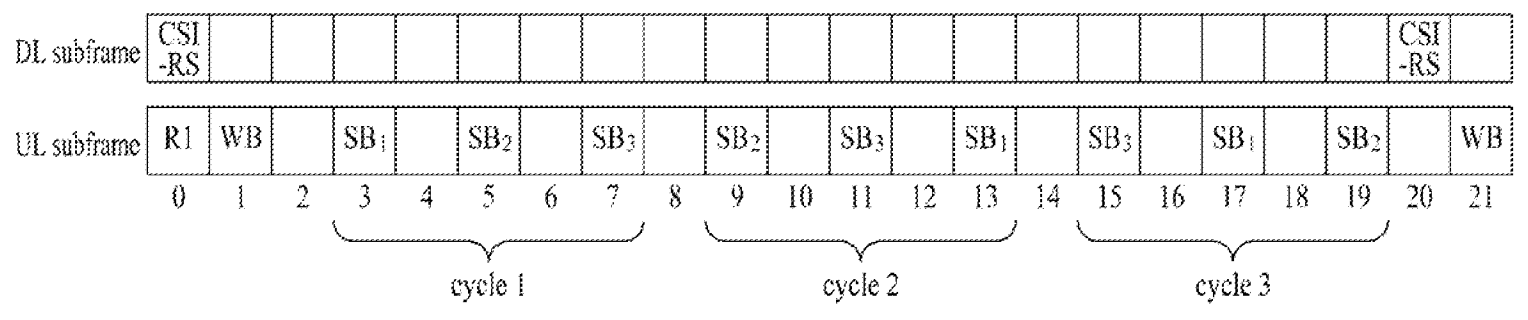

FIG. 11 illustrates a CSI feedback scheme according to an exemplary embodiment of the present invention. In the case in which the order of the subband, in which the CSI is fed back, is basically SB1, SB2 and SB3, the order of the cyclic-shifted subband may be SB2, SB3, SB1 or SB3, SB1, SB2. For example, as shown in FIG. 11, in the first cycle (uplink subframes 3, 5, 7), the SB CSI is fed back in the order of SB1, SB2 and SB3, and in the second cycle (uplink subframes 9, 11, 13), the SB CSI is fed back in the order of SB2, SB3 and SB1. Here, the number of subbands, the number of SB CSI feedback cycles, cyclic-shift scheme, etc. are merely exemplary. That is, the present embodiment includes schemes in which the order of subbands, in which the CSI is fed back, is changed in a cyclic shift method for each cycle in the case in which the CSI for a plurality of subbands is fed back in a plurality of times of the cycle for one period of the CSI-RS transmission.

Likewise, the average CSI error, which is suffered by the CSI for each subband, is scattered by cyclic-shifting the order of the subbands in which the CSI is fed back for each SB CSI feedback cycle, and thereby the CSI errors are prevented from being centralized in specific SB CSI.

Exemplary Embodiment 2

The present embodiment relates to a scheme which symmetrically changes the order of the subbands for each cycle of the SB CSI feedback.

Figure 12:
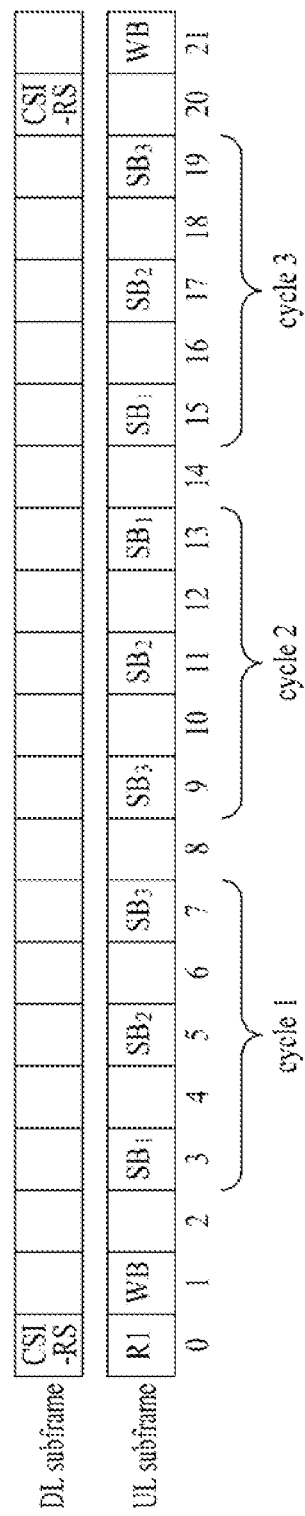

FIG. 12 illustrates a CSI feedback scheme according to an exemplary embodiment of the present invention. In the case in which the order of the subband, in which the CSI is fed back, is basically SB1, SB2 and SB3, the order of the symmetrically changed subbands may be SB3, SB2 and SB1. The symmetrically changed order may also be expressed as the reversely changed order. For example, as shown in FIG. 12, in the first cycle (uplink subframes 3, 5, 7), the SB CSI is fed back in the order of SB1, SB2 and SB3, in the second cycle (uplink subframes 9, 11, 13), the SB CSI is fed back in the order of SB3, SB2 and SB1, in the third cycle (uplink subframes 15, 17, 19), the SB CSI is fed back in the order of SB1, SB2 and SB3. Here, the number of subbands, the number of SB CSI feedback cycles, etc. are merely exemplary. That is, the present embodiment includes schemes in which the order of the subbands, in which the CSI is fed back for each cycle, is symmetrically changed in the case in which the CSI for a plurality of subbands is fed back by a plurality of times of the cycle for one period of the CSI-RS transmission.

Likewise, by symmetrically changing the order of subbands in which the CSI is fed back for each SB CSI feedback cycle, the CSI errors may be prevented from being concentrated in specific SB CSI.

Exemplary Embodiment 3

Above described embodiments 1 and 2 relate to schemes about the case in which SB CSI transmission has a plurality of cycles for one period of the CSI-RS transmission, but even in the case in which the SB CSI transmission has one cycle during one period of the CSI-RS transmission, the CSI errors may be concentrated in specific SB CSI.

Figure 13:
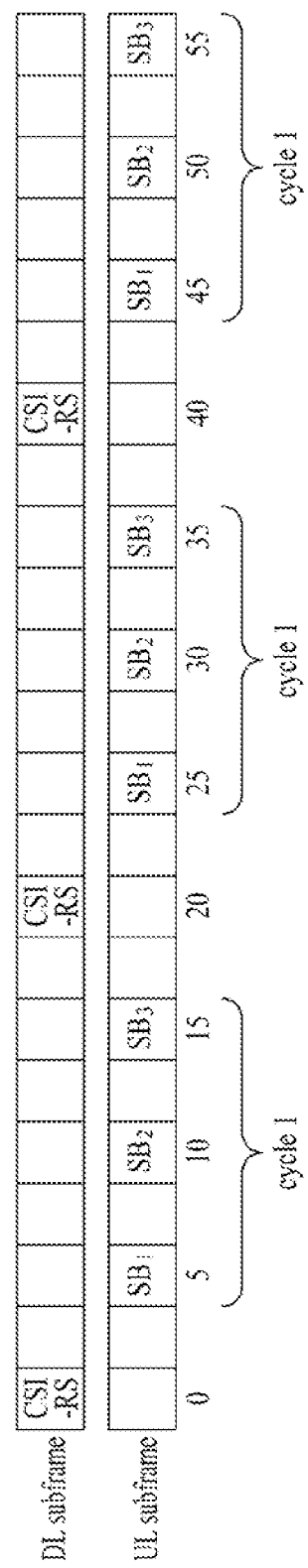
FIG. 13 illustrates an example of downlink channel measurement and report using CSI-RS.

FIG. 13 illustrates a case in which SB CSI transmission has one cycle during one period of the CSI-RS transmission. FIG.

13 illustrates a case in which the order of subbands, in which the CSI is fed back, is fixed as SB1, SB2 and SB3.

As in FIG. 13, in the case in which the SB CSI is fed back, the CSI errors are concentrated in SB3. For example, as illustrated in FIG. 13, in one cycle of SB CSI feedback, the CSI for SB1, SB2 and SB3 has latencies of 5 ms, 10 ms and 15 ms, respectively, from the time point when the CSI-RS has been received. From the time point when the CSI-RS has been received, the latency of CSI transmission is proportional to the possibility that the accuracy of the CSI is lowered. That is, in FIG. 13, in the case of SB3, from the time point when the CSI-RS has been received, the latency of the time point, in which the SB CSI is fed back, is always larger than that of other SBs, and thus SB3 CSI may have a larger CSI error than other SB CSIs.

According to an exemplary embodiment of the present invention, in order to solve the above mentioned problem, by changing the order of subbands, in which the CSI is fed back, by a cyclic shift method for each cycle, the CSI error may be prevented from being concentrated in the CSI for a specific subband.

Figure 14:
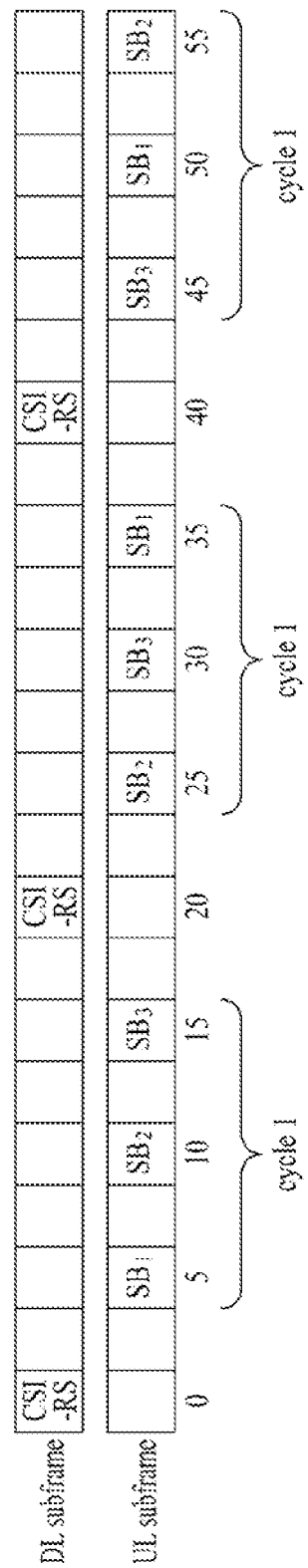
FIGS. 14 and 15 illustrate a CSI feedback scheme according to an exemplary embodiment of the present invention.

FIG. 14 illustrates a SB CSI feedback scheme according to an exemplary embodiment of the present invention. As illustrated in FIG. 14, SB CSI feedback cycle may be performed one time during one transmission cycle of CSI-RS, and the order of subbands, in which the CSI is fed back, may be change in a cyclic shift method for each cycle. For example, as shown in FIG. 14, in the first cycle (uplink subframes 5, 10, 15), the SB CSI is fed back in the order of SB1, SB2 and SB3, in the second cycle (uplink subframes 25, 30, 35), the SB CSI is fed back in the order of SB2, SB3 and SB1, and in the third cycle (uplink subframes 45, 50, 55), the SB CSI may be fed back in the order of SB3, SB1 and SB2. Here, the number of subbands, the cyclic shift method, etc. are merely exemplary. That is, the present embodiment includes all schemes in which the order of subbands, in which the CSI is fed back, is changed in a cyclic shift method for each cycle in the case in which the CSI for a plurality of subbands is fed back by one cycle during one period of the CSI-RS transmission.

Exemplary Embodiment 4

The present embodiment relates to a scheme for symmetrically changing the order of subbands for each cycle of the SB CSI feedback.

Figure 15:
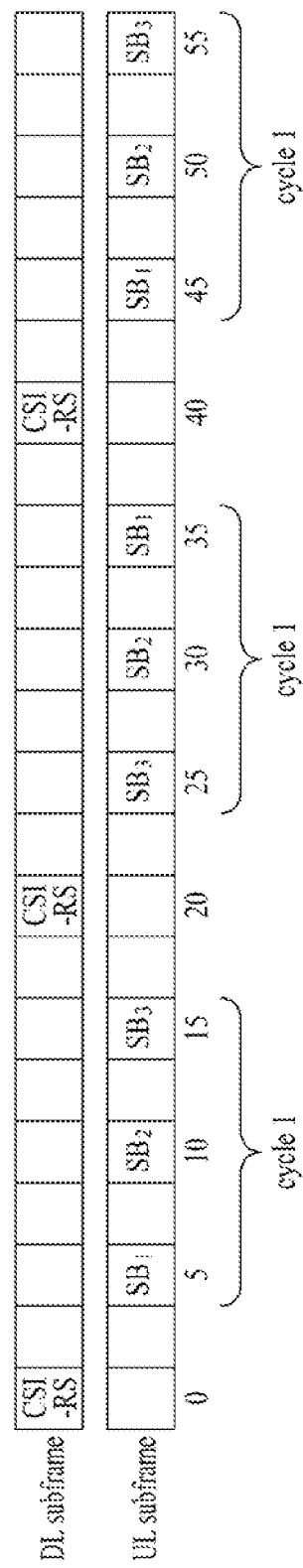

FIG. 15 illustrates a SB CSI feedback scheme according to an exemplary embodiment of the present invention. As illustrated in FIG. 15, the SB CSI feedback cycle may be performed once during one transmission period of the CSI-RS, and the order of subbands, in which the CSI is fed back, may be symmetrically changed for each cycle. For example, as shown in FIG. 15, in the first cycle (uplink subframes 5, 10, 15), the SB CSI is fed back in the order of SB1, SB2 and SB3, in the second cycle (uplink subframes 25, 30, 35), the SB CSI is fed back in the order of SB3, SB2 and SB1, and in the third cycle (uplink subframes 45, 50, 55), the SB CSI is fed back again in the order of SB1, SB2 and SB3. Here, the number of subbands, the cyclic shift method, etc. are merely exemplary. That is, the present embodiment includes all schemes in which the order of subbands, in which the CSI is fed back, is symmetrically changed for each cycle in the case in which the CSI for a plurality of subbands is fed back by one cycle during one period of the CSI-RS transmission.

The cyclic shift method and symmetric order change scheme has been described as a representative example of changing the order of subbands, in which the CSI is fed back, in the above exemplary embodiments 1 to 4, but an order change scheme, in which the error occurrence rate of CSI is evenly distributed, may also be applied for each subband. For example, the order of subbands, in which the CSI is fed back in one cycle, may be changed in a different scheme (e.g., randomly), or the order of subbands, in which the CSI is fed back, may also be changed only when necessary.

Exemplary Embodiment 5

The present embodiment relates to a scheme for applying the above explained CSI feedback scheme in a multi-cell environment.

Figure 16:
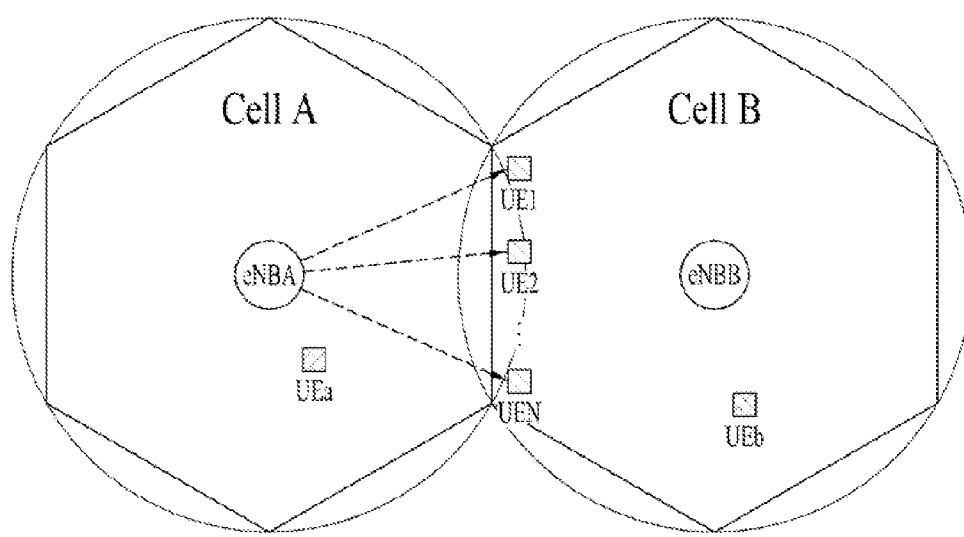
FIG. 16 illustrates exemplary embodiments of the present invention which are applied in a multi-cell environment.

FIG. 16 illustrates a multi-cell environment. In FIG. 16, cell A and cell B are located adjacent to each other. UEa is an UE which is served by cell A, UEb is a UE which is served by cell B, UEa and UEb are respectively located in the center of each cell. UE1, UE2, . . . , UEN are UEs which are located in the cell edge, are served by cell B, and are interfered by cell A. In FIG. 16, the dotted line from eNB A denotes interference given to UEs located in the edge of cell A and cell B. Further, UEs (UEb, UE1, UE2, . . . , UEN), which are served by cell B, may measure the downlink channel from cell B and generate CSI using CSI-RS transmitted with a long period in downlink from cell B.

In order to relieve the interference given to UEs of cell A and cell B, cell A and cell B may be operated in a CoMP scheme. Here, in the frequency resources, the CoMP operation may also be performed in the unit of subbands. For example, in the case in which interference from cell A is strong in a certain subband among the entire bands, the operation of reducing interference of cell A may be performed for the subband. In order to explain the present embodiment with respect to the above described embodiments 1 to 4, it is assumes that there are three subbands (SB1, SB2, SB3), and the subband, in which the interference of cell A is strong, is SB3. For example, the intensity of the interference given to UEs (UE1, UE2, . . . , UEN), which are located in the cell edge, may be lowered as cell A is operated to transmit downlink signals at low transmission power. As such, the SINR, which is measured on SB3, gets better to UEs (UE1, UE2, . . . , UEN), which are located in the cell edge, and thus the CSI, which shows relatively good channel state, may be fed back in the SB3 compared to other SBs. In the scheduler of cell B, which receives such a CSI feedback, resources may be allocated to SB3 for downlink transmission to UEs (UE1, UE2, . . . , UEN) which are located in the cell edge.

Likewise, in order to appropriately perform CoMP operation, it is necessary for accurate CSI to be fed back for each subband. However, in the case in which UEs (UE1, UE2, . . . , UEN), which are located in the cell edge, feedback CSI for each subband as in FIG. 10 or FIG. 13, less accurate CSI is likely to be measured and fed back for SB3 compared to other SBs. That is, the errors of CSI, which does not reflect the actual current downlink channel state, may be concentrated in SB3. Likewise, in the case in which CSI errors on specific SB are concentrated, the accurate MSC may not be set for the SB, and consequently, it may become difficult for cooperative cells to form the accurate transmission beam in CoMP operation. In particular, as in the example above, in the case in which an adjacent eNB reduces interference for SB3, in order to secure a performance gain due to CoMP, the accuracy of SB3 is more important than other SBs, and thereby the performance may be fatally affected when errors of the CSI are concentrated in SB3.

Hence, as in various exemplary embodiments of the present invention, it is necessary to maintain the accuracy of CSI for all subbands by changing the order of subbands, in which the CSI is fed back. For example, in the above example, the CoMP operation may be more accurately and efficiently performed by substantially securing even opportunities in which the accurate CSI may be measured and fed back for all SBs in the above described embodiment.

In the above explained embodiments 1 to 5, the cyclic shift scheme and the symmetric order change scheme have been explained as schemes for changing the order of subbands, in which the CSI is fed back, but the order change scheme, in which the error occurrence rate of CSI may be evenly distributed for each subband, may also be applied. For example, in one cycle, the order of subbands, in which CSI is fed back, may be changed according to a preset rule or randomly, and only when necessary, the order of subbands, in which the CSI is fed back, may be changed according to the instruction of the eNB.

Exemplary Embodiment 6

In the above described various embodiments of the present invention, in the case in which one terminal measures and generates CSI using CSI-RS, which is transmitted with a long period of n (n>1) subframe unit, not a reference signal transmitted for every subframe, and the channel state changes as time passes, in order to solve the problem that the accuracy of the subband CSI transmitted in the uplink subframe having a long latency from the CSI-RS receiving time point is lowered, a scheme for changing, by the UE, the order of subbands, in which the CSI is fed back, has been described.

As an extended application example of the embodiments of the present invention, an embodiment about a case, in which the CSI for the downlink channel is fed back from each of the plurality of UEs, will be described below.

In the example of FIG. 16, UEs (UE1, UE2, . . . , UEN), which are served by cell B, may measure the downlink channel from cell B and feedback the CSI using CSI-RS transmitted with a long period on the downlink from cell B. Here, CSI-RS is cell-specifically transmitted (that is, commonly to UEs within the cell), and it is assumed that all UEs within cell B receive CSI-RS at the same time point.

In such a situation, a case, which the order of time, when the CSI feedback is performed from a plurality of UEs, may be assumed. For example, the CSI of the downlink channel on each of the UEs may be measured and reported in the order of UE1, UE2, . . . , UEN. That is, the CSI feedback time point of each UE may be set in a manner that UE2 feedbacks the CSI at a time point later than that of UE1, and UE3 feedbacks the CSI at a time point later than that of UE2. If the CSI feedback order of such a plurality of UEs is always fixed, a certain UE (e.g., UE2) may always have a long latency in the CSI-RS reception time point and the CSI feedback time point compared to those of other UEs (e.g., UE1), and thereby may feedback inaccurate CSI. Here, the CSI may be fed back from one or more UEs in a specific uplink subframe, but the present invention assumes a case in which the CSI feedback time point is fixedly late compared to other UEs, and a solution thereto will be described below.

In the case in which a plurality of UEs measure and feedback CSI using CSI-RS transmitted cell-specifically with a long period, by changing the CSI feedback order of each UE, CSI errors of each UE may be prevented from being concentrated in a certain UE. For example, if UE2 feedbacks CSI in a time point later than that of UE1, uplink resources for CSI feedback may be allocated so that UE2 may feedback CSI in a time point earlier than that of UE1 at the next transmission. The CSI feedback order of a plurality of UEs may be changed in various manners. Here, the order of UEs, which feedback CSI, may be changed according to a cyclic shift method, or may be symmetrically changed. The order of the UE, which feedbacks the CSI, may be changed according to a preset rule or randomly.

Further, when each of a plurality of UEs, which feedback the CSI, feedbacks SB CSI for one or more subbands, the order of the subbands, in which each UE feedbacks CSI, may be changed in a scheme which has been described in the above embodiments 1 to 5. In other words, the order of UEs, which feedback CSI, is changed, and at the same time, the order of subbands, in which the feedback is performed in one UE, may also be changed.

Figure 17:
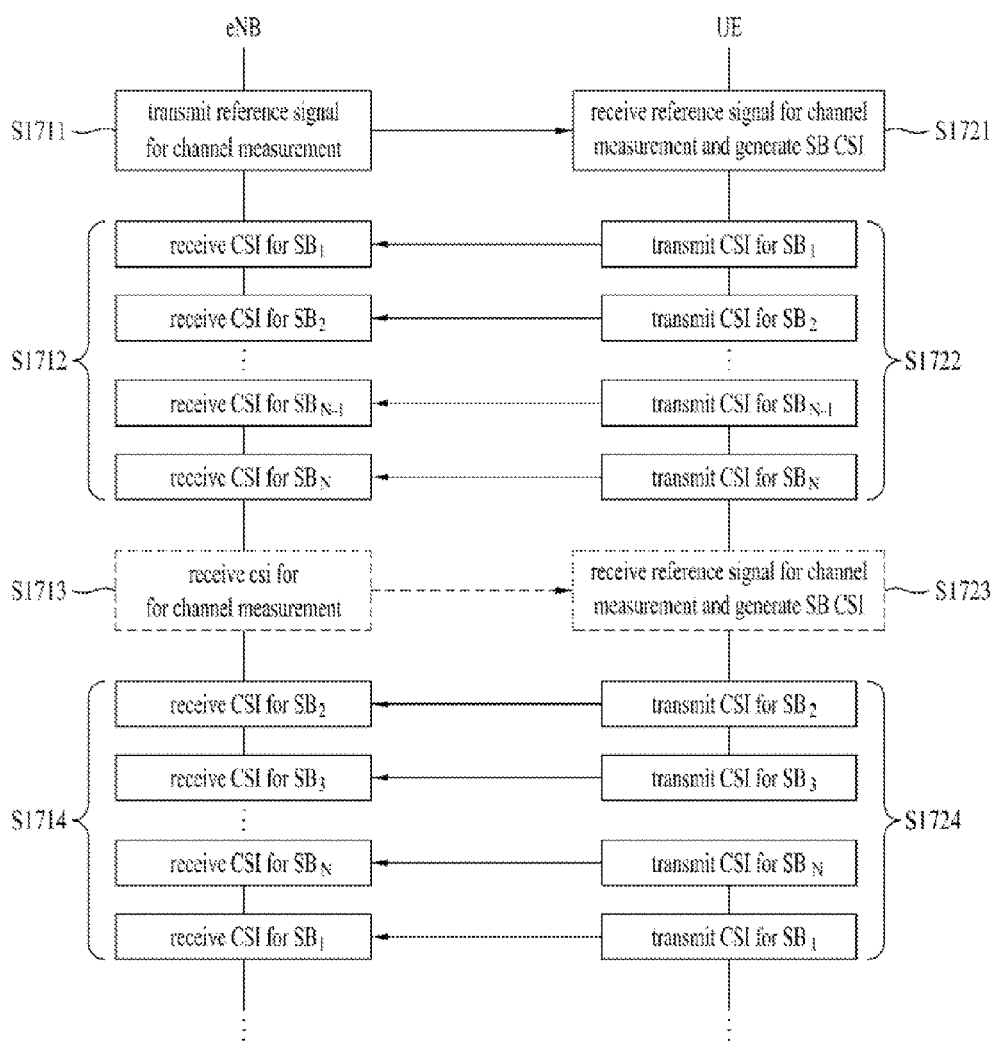
FIG. 17 is a flowchart illustrating a method for transmitting and receiving channel state information according to an exemplary embodiment of the present invention.

FIG. 17 is a flowchart illustrating a method of transmitting and receiving CSI according to an exemplary embodiment of the present invention.

In step S1711, an eNB may transmit a reference signal (CSI-RS) for downlink channel measurement to a UE. The CSI-RS may be intermittently transmitted.

In step S1721, a UE may measure the downlink channel using the CSI-RS received from the eNB, and generate CSI. The CSI may include RI, PMI, CQI, etc., and the PMI and CQI may be calculated and determined as CSI for the wideband (WB) and the CSI for the subband (SB), respectively. The CSI for the subband (SB CSI) may mean PMI and/or CQI for the subband. In the case in which the downlink frequency band measured by the UE is composed of a plurality of subbands, the UE may generate SB CSI for each of the plurality of subbands. FIG. 17 illustrates a case in which the number of a plurality of subbands is N.

In S1722, a UE may sequentially transmit SB CSI for each of the plurality of subbands. Sequential transmission of SB CSI means transmission according to time order. For example, the CSI for one SB is transmitted at one uplink transmission time point, and then CSI for another SB is transmitted at a preset downlink time point. The example of FIG. 17 shows that according to time order, the CSI for the first subband (SB1) is transmitted, the CSI for the second subband (SB2) is transmitted, . . . , the CSI for Nth subband (SBN) is transmitted. As such, the eNB may sequentially receive CSI for each SB in step S1712.

Steps S1713 and S1723 may or may not be performed depending on the case. The case, in which steps S1713 and S1723 are not performed, corresponds to a CSI transmission and reception method for a case in which SB CSI transmission has a plurality of cycles for one period of CSI-Rs transmission as in the above described embodiments 1 and 2 of the present invention. Further, the case, which S1713 and S1723 are performed, corresponds to a CSI transmission and reception method for a case in which SB CSI transmission has one cycle for one period of CSI-RS transmission as in the above described embodiments 3 and 4 of the present invention.

In the case in which S1713 and S1723 are performed, the SB CSI, which is transmitted in step S1724, may be generated on the basis of the CSI-RS received in step S1723. Further, in the case in which steps S1713 and S1723 are not performed, the SB CSI, which is transmitted in S1724, may be generated on the basis of the CSI-RS received in step S1721. In other words, the transmitted SB CSI may be generated on the basis of the most recently received CSI-RS.

In step S1724, the UE may sequentially transmit SB CSI for each of the plurality of subbands. Here, the order of sequential transmission in step S1724 may be performed according to an order which is different from that of the order of the sequential transmission in step S1722. In other words, the order of the sequential transmission at step S1724 may be different from that of the previous sequential transmission. Here, a different order may mean an order which has been changed in a cyclic shift scheme or has been changed reversely. Thereafter, step S1724 may be repeatedly performed. That is, a step, in which a plurality of SB CSIs are sequentially transmitted according to an order, which is different from that of the previous sequential transmission, may be repeatedly performed.

FIG. 17 shows performance of step S1724 according to an order which has been changed in a cyclic shift scheme. That is, if the SB CSI has been transmitted in the order of SB1, SB2, ..., SBN−1, SBN in step S1722, the SB CSI may be transmitted in the order of SB2, SB3, ..., SBN, SB1 in step S1724. If the sequential transmission step of SB CSI is performed after step S1724, the SB CSI may be transmitted in the order of SB3, SB4, ..., SBN, SB1, SB2.

Further, in the case in which step S1724 is performed according to a reversely changed order, if the SB CSI has been transmitted in the order of SB1, SB2, ..., SBN−1, SBN in step S1722, the SB CSI may be transmitted in the order of SBN, SBN−1, ..., SB2, SB1 in step S1724. If the following sequential transmission step of the SB CSI is transmitted after step S1724, the SB CSI may be transmitted in the order of SB1, SB2, ..., SBN−1, SBN.

In step S1714, the eNB may receive SB CSI which is sequentially transmitted from the UE at step S1724.

Although not illustrated in FIG. 17, in the case in which the eNB receives downlink CSI from a plurality of UEs, the eNB may transmit CSI-RS to each of the plurality of UEs, and receive CSI generated in each UE. Here, if the order, in which each UE transmits CSI, is predetermined, after the eNB receives CSI from each of all of the UEs, the order, in which a plurality of UEs transmit CSI, may be changed in the next cycle. Further, as for the SB CSI transmitted in each UE, the order, in which SB CSI is sequentially transmitted for each cycle, may be changed as stated above.

In the above described method for transmitting and receiving CSI described with reference to FIG. 17, the points, which have been described in the above described various embodiments of the present invention, may be independently applied, or two or more embodiments may be applied at the same time, and redundant points are omitted for clarity of the explanation.

Further, in the description about FIG. 17, the operation of the eNB may be applied in the same manner for the relay device as a downlink transmission body or an uplink reception body. Further, the operation of the UE may be applied in the same manner for the relay as an uplink transmission body or a downlink reception body.

Figure 18:
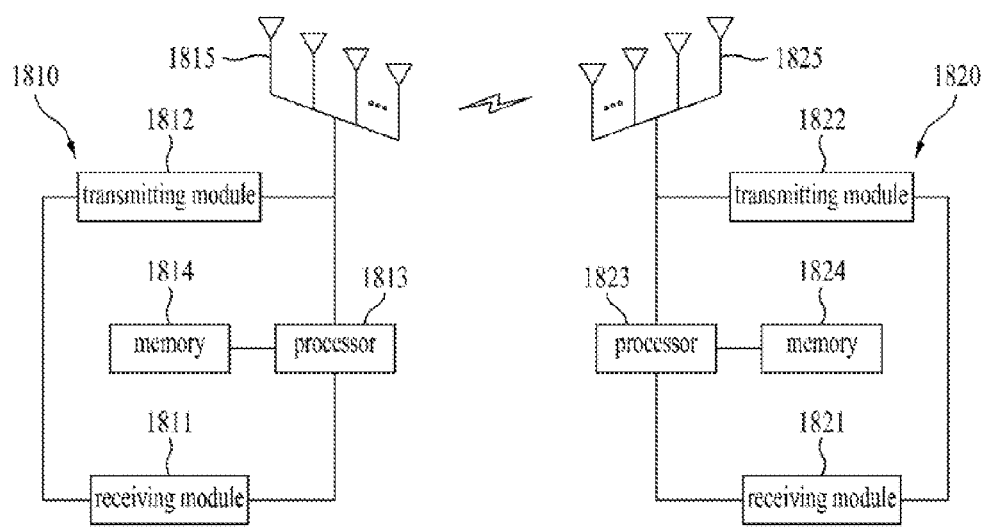
FIG. 18 illustrates a structure of a terminal and a base station according to an exemplary embodiment of the present invention.

FIG. 18 illustrates a configuration of an UE device and an eNB device according to the present invention.

Referring to FIG. 18, an UE device 1810 may include a receiving module 1811, a transmitting module 1812, a processor 1813, a memory 1814 and a plurality of antennas 1815. The plurality of antennas 1815 refer to an UE device which supports MIMO transmission and reception. The receiving module 1811 may receive various signals data and information in downlink from an eNB. The transmission module 1812 may transmit various signals, data, and information in uplink from an eNB. The processor 1813 may control overall operation of the UE device 1810.

The UE device according to an exemplary embodiment of the present invention may be configured to transmit CSI. The processor 1811 of the UE device may be configured to receive a reference signal for channel measurement from an eNB through the receiving module 1811. Further, the processor 1813 may be configured to generate SB CSI for each of the plurality of subbands (SB) in the UE using the received reference signal. Further, the processor 1813 may be configured to sequentially transmit each of the generated SB CSIs to the eNB through the transmitting module 1812. Further, the processor 1813 may be configured to sequentially transmit each of the SB CSIs to the eNB through the transmitting module 1812 according to an order which is different from that of the previous sequential transmission.

In addition, the processor 1813 of the UE device 1810 processes information received by the UE device 1810, information to be transmitted to the outside, etc. The memory 1814 may store processed information, etc., and may be substituted by a component such as a buffer (not shown).

Referring to FIG. 18, the eNB 1820 according to an exemplary embodiment of the present invention may include a receiving module 1821, a transmitting module 1822, a processor 1823, a memory 1824 and a plurality of antennas 1825. The plurality of antennas refer to an eNB device which supports MIMI transmission and reception. The receiving module 1821 may receive various signals, data, and information in uplink from an eNB. The transmitting module 1822 may transmit various signals, data and information in downlink to a UE. The processor 1823 may control overall operation of the eNB 1820.

The eNB 1820 according to an exemplary embodiment of the present invention may be configured to receive CSI. The processor 1823 of the eNB may be configured to transmit a reference signal for channel measurement to the UE through the transmitting module 1822. Further, the processor 1823 may be configured to sequentially receive each of the SB CSIs, which have been generated in the UE for each of the plurality of subbands (SB) using the transmitted reference signal, from the UE through the receiving module 1821. Further, the processor 1823 may be configured to sequentially receive each of the SB CSIs, from the UE through the receiving module 1821 according to an order which is different from that of the previous sequential transmission.

The processor 1823 of the eNB 1820 processes information received by the eNB device 1820 and information to be transmitted to the outside, etc. The memory 1824 may store the processed information, etc. for a preset period of time, and may be substituted by a component such as a buffer (not shown).

The overall configuration of the above eNB device and UE device may be implemented so that the points, which have been described in the above described various embodiments of the present invention, may be independently applied or two or more embodiments may be applied at the same time, and redundant points are omitted for clarity of explanation.

Further, in the description of FIG. 18, the configuration of the eNB device may be applied, in the same manner, to the relay device as a downlink transmission body or a uplink reception body, and the configuration of the UE may also be applied, in the same manner, to the relay device as a uplink transmission body or a downlink reception body.

The exemplary embodiments of the present invention may be implemented through various means. For example, the exemplary embodiments of the present invention may be implemented by hardware, firmware, software, and any of their combinations.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, methods according to exemplary embodiments of the present invention may be implemented in the form of modules, procedures, functions, and the like, performing the functions and operations as described above. A software code may be sorted in a memory unit and driven by a processor. The memory unit may be positioned within or outside the processor and transmit and receive data to and from the process through various already known means.

As described above, the detailed description on exemplary embodiments disclosed above has been provided so that those skilled in the art can implement and perform the present invention. In the above description, the description has been made with reference to the exemplary embodiments of the present invention, but it is understood that those skilled in the art can modify and change the present invention within a range that does not exceed the scope of the present invention. For example, those skilled in the art may use combine each configuration disclosed in the above described embodiments. Hence, the present invention does not limit exemplary embodiments shown here, but intends to give the widest scope which coincides with the principles and new features disclosed here.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

INDUSTRIAL APPLICABILITY

The above described exemplary embodiments of the present invention may be applicable to various mobile communication systems.

The invention claimed is:

1. A method for transmitting channel state information (CSI) in a terminal, the method comprising:
receiving a first reference signal for channel measurement from a base station;
generating sub-band (SB) CSI for each of a plurality of SBs using the received first reference signal in the terminal, the plurality of SBs including a first SB and a second SB;
transmitting the generated SB CSI to the base station sequentially according to a first SB order; and
transmitting the generated SB CSI to the base station sequentially according to a second SB order different from the first SB order,
wherein an average SB CSI transmission latency for the first SB according to the first SB order and the second SB order is equivalent to an average SB CSI transmission latency for the second SB according to the first SB order and the second SB order.

2. The method according to claim 1, wherein the second SB order is an order which has been changed according to a cyclic shift scheme or an order which has been changed reversely.

3. The method according to claim 1, further comprising:
receiving a second reference signal for channel measurement from the base station after the transmission according to the first SB order and before the transmission according to the second SB order.

4. The method according to claim 1, wherein the SB CSI is generated using the most recently received reference signal.

5. The method according to claim 1, wherein the transmission of the SB CSI is repeated according to a plurality of SB orders including the first SB order and the second SB order.

6. A method for receiving channel state information (CSI) in a base station, the method comprising:
transmitting a first reference signal for channel measurement to a terminal;
receiving, from the terminal sequentially according to a first SB order, sub-band CSI generated in the terminal for each of a plurality of sub-bands (SBs) the plurality of SBs including a first SB and a second SB; and
receiving each SB CSI from the terminal sequentially according to a second SB order different from the first SB order,
wherein an average SB CSI reception latency for the first SB according to the first SB order and the second SB order is equivalent to an average SB CSI reception latency for the second SB according to the first SB order and the second SB order.

7. The method according to claim 6, wherein the second SB order is an order which has been changed according to a cyclic shift scheme or an order which has been changed reversely.

8. The method according to claim 6, further comprising:
transmitting a second reference signal for channel measurement to the terminal after the reception according to the first SB order and before the reception according to the second SB order.

9. The method according to claim 6, wherein the SB CSI is generated using the most recently received reference signal in the terminal.

10. The method according to claim 6, wherein the transmission of the SB CSI is repeated according to a plurality of SB orders including the first SB order and the second SB order.

11. A method for receiving channel state information (CSI) in a base station, the method comprising:
a first step of transmitting a reference signal for channel measurement to a first terminal among a plurality of terminals;
a second step of sequentially receiving, from the first terminal according to a first sub-band (SB) order, sub-band CSI generated in the terminal for each of a plurality of SBs; and
a third step of sequentially receiving each SB CSI from the first terminal according to a second SB order different from the first SB order;
performing the first to third steps for one or more second terminals among the plurality of terminals, and sequentially receiving CSI from each of the plurality of terminals according to a first terminal order; and
sequentially receiving CSI from each of the plurality of terminals in a second terminal order which is different from the first terminal order.

12. A terminal for transmitting channel state information (CSI), the terminal comprising:
a receiver configured to receive a downlink signal from a base station;
a transmitter configured to transmit an uplink signal to the base station; and a processor configured to control the terminal, the processor including the receiver and the transmitter, wherein the processor is configured to:
- receive a first reference signal for channel measurement from the base station;
- generate sub-band (SB) CSI for each of a plurality sub-bands (SBs) using the received first reference signal in the terminal, the plurality of SBs including a first SB and a second SB;
- transmit the generated SB CSI to the base station sequentially according to a first SB order; and
- transmit the generated SB CSI to the base station sequentially according to a second SB order different from the first SB order,
- wherein an average SB CSI transmission latency for the first SB according to the first SB order and the second SB order is equivalent to an average SB CSI transmission latency for the second SB according to the first SB order and the second SB order.

* * * * *